United States Patent
Sasakawa et al.

(10) Patent No.: US 8,846,229 B2
(45) Date of Patent: Sep. 30, 2014

(54) NONAQUEOUS ELECTROLYTE BATTERY AND BATTERY PACK

(75) Inventors: Tetsuya Sasakawa, Yokohama (JP); Takashi Kishi, Yokosuka (JP); Takuya Iwasaki, Uenohara (JP); Hiroki Inagaki, Yokohama (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/538,153

(22) Filed: Jun. 29, 2012

(65) Prior Publication Data

US 2013/0059184 A1 Mar. 7, 2013

(30) Foreign Application Priority Data

Sep. 5, 2011 (JP) ................. 2011-192933

(51) Int. Cl.
*H01M 4/00* (2006.01)
*H01M 2/26* (2006.01)
*H01M 4/66* (2006.01)
*H01M 4/131* (2010.01)
*H01M 4/485* (2010.01)

(52) U.S. Cl.
CPC .............. *H01M 2/263* (2013.01); *Y02E 60/122* (2013.01); *H01M 4/661* (2013.01); *H01M 4/131* (2013.01); *H01M 4/485* (2013.01)
USPC .............. 429/94; 429/149; 429/153; 429/152

(58) Field of Classification Search
USPC .................... 429/94, 149, 152, 153
See application file for complete search history.

(56) References Cited

U.S. PATENT DOCUMENTS

2008/0070115 A1* 3/2008 Saruwatari et al. ........... 429/211

FOREIGN PATENT DOCUMENTS

JP 2002-110171 4/2002

* cited by examiner

*Primary Examiner* — Jane Rhee
(74) *Attorney, Agent, or Firm* — Oblon, Spivak, McClelland, Maier & Neustadt, L.L.P.

(57) ABSTRACT

According to one embodiment, a non-aqueous electrolyte battery includes an electrode group. The electrode group includes a positive electrode and a negative electrode. At least one of the positive electrode or the negative electrode has a first electrode part and a second electrode part. The first electrode part includes a first metal substrate and an active material-containing part. The second electrode part includes a second metal substrate and an active material-containing part. The first metal substrate has a tensile strength larger than a tensile strength of the second metal substrate. A part of the first electrode part is provided more outside of the electrode group than a part of the second electrode group.

17 Claims, 12 Drawing Sheets

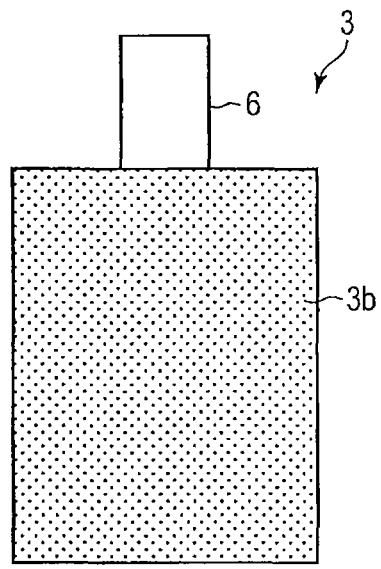
F I G. 2
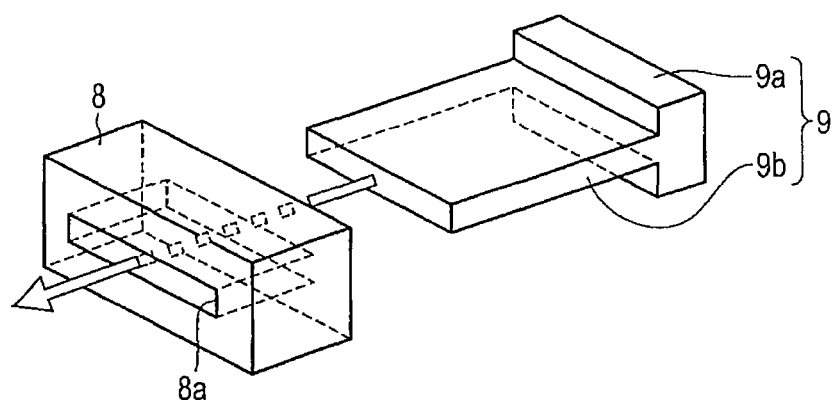
F I G. 3

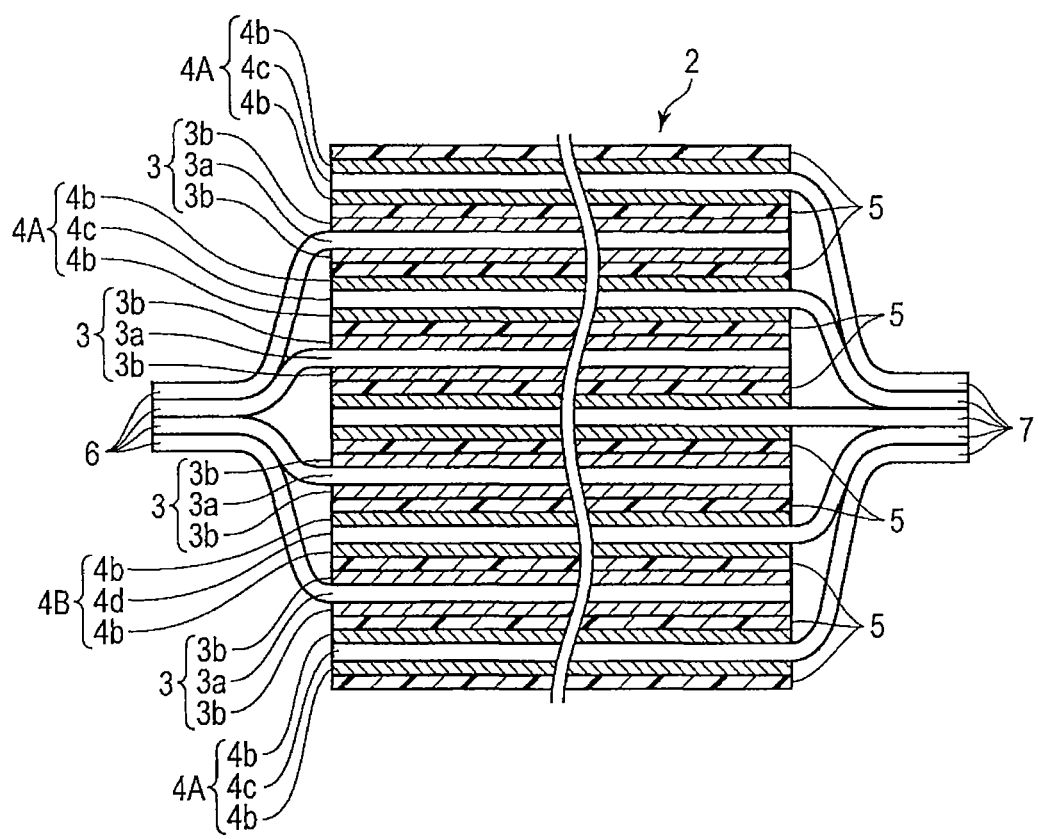
F I G. 4

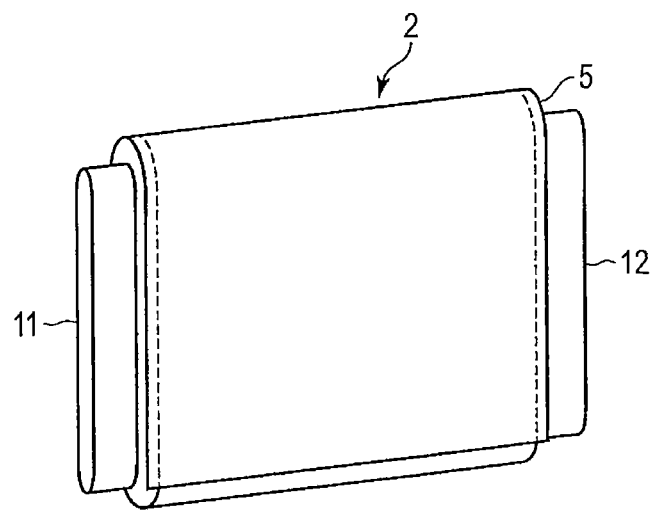
F I G. 9
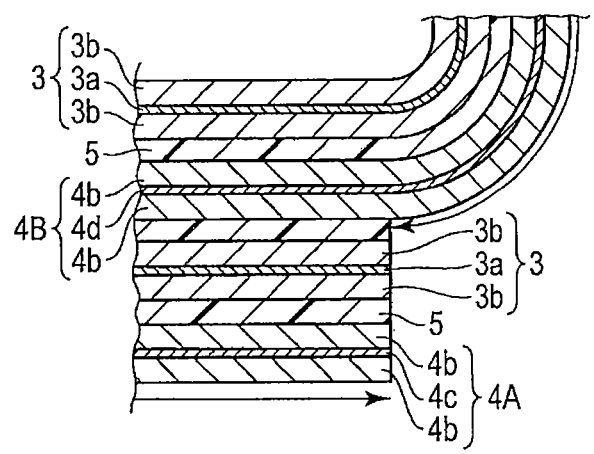
F I G. 10

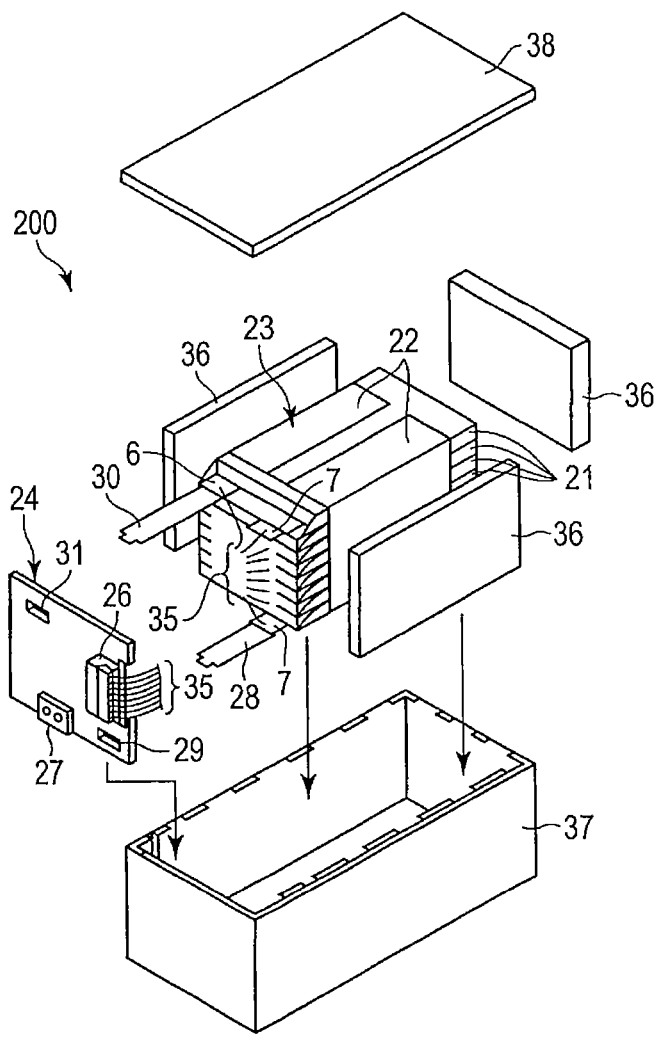
F I G. 14

NONAQUEOUS ELECTROLYTE BATTERY AND BATTERY PACK

CROSS-REFERENCE TO RELATED APPLICATIONS

This application is based upon and claims the benefit of priority from Japanese Patent Application No. 2011-192933, filed Sep. 5, 2011, the entire contents of which are incorporated herein by reference.

FIELD

Embodiments described herein relate generally to a nonaqueous electrolyte battery and a battery pack.

BACKGROUND

With the increased application of lithium ion secondary batteries in automobiles and hybrid automobiles, a higher energy density is required.

In general, each of a positive electrode and a negative electrode of a nonaqueous electrolyte battery is obtained by coating a slurry containing an active material on a metal foil of aluminum or copper. In order to make the energy density higher, it is necessary to make the metal foil thinner, and to make the electrodes smaller and lighter. However, when the metal foil is made thinner, there is a problem that the mechanical strength of the electrode tends to be deteriorated to result in fracture. In particular, an electrode located on the outermost layer that is a collector tab fixing part in an electrode group is likely to be affected by stress more than other portions, resulting in fractures, which deteriorates a battery capacity, and an increase in the internal resistance.

BRIEF DESCRIPTION OF THE DRAWINGS

FIG. 2 is a plan view showing a positive electrode used in the nonaqueous electrolyte battery of FIG. 1;

FIG. 3 is a perspective view showing an insulating member and a positive electrode terminal used in the nonaqueous electrolyte battery of FIG. 1;

FIG. 4 is a sectional view of an electrode group of the nonaqueous electrolyte battery according to a first embodiment;

FIG. 9 is a perspective view of the electrode group of the nonaqueous electrolyte battery according to the fifth embodiment;

FIG. 10 is a sectional view showing an essential part of the electrode group of the nonaqueous electrolyte battery according to the fifth embodiment;

FIG. 14 is an exploded perspective view of a battery pack according to a seventh embodiment.

DETAILED DESCRIPTION

According to one embodiment, a nonaqueous electrolyte battery that includes a case, and an electrode group that is housed inside of the case and contains a positive electrode and a negative electrode is provided. At least one of the positive electrode or the negative electrode has a first electrode part and a second electrode part. The first electrode part includes a first metal substrate, and an active material-containing part formed at least partially on the first metal substrate. The second electrode part includes a second metal substrate, and an active material-containing part formed at least partially on the second metal substrate. The first metal substrate has a tensile strength larger than that of the second metal substrate. A part of the first electrode part is disposed more outside of the electrode group than a part of the second electrode group.

Further, according to another embodiment, a battery pack containing the nonaqueous electrolyte battery according to the embodiment is provided.

In what follows, embodiments will be described with reference to the drawings.

First Embodiment

According to a first embodiment, a nonaqueous electrolyte battery that includes a case and an electrode group that is housed inside of the case and contains a positive electrode and a negative electrode is provided. The electrode group is a laminated electrode group where a positive electrode and a negative electrode are alternatively laminated with a separator interposed therebetween. An electrode having a first electrode part and a second electrode part is used as a negative electrode.

Figure 1:
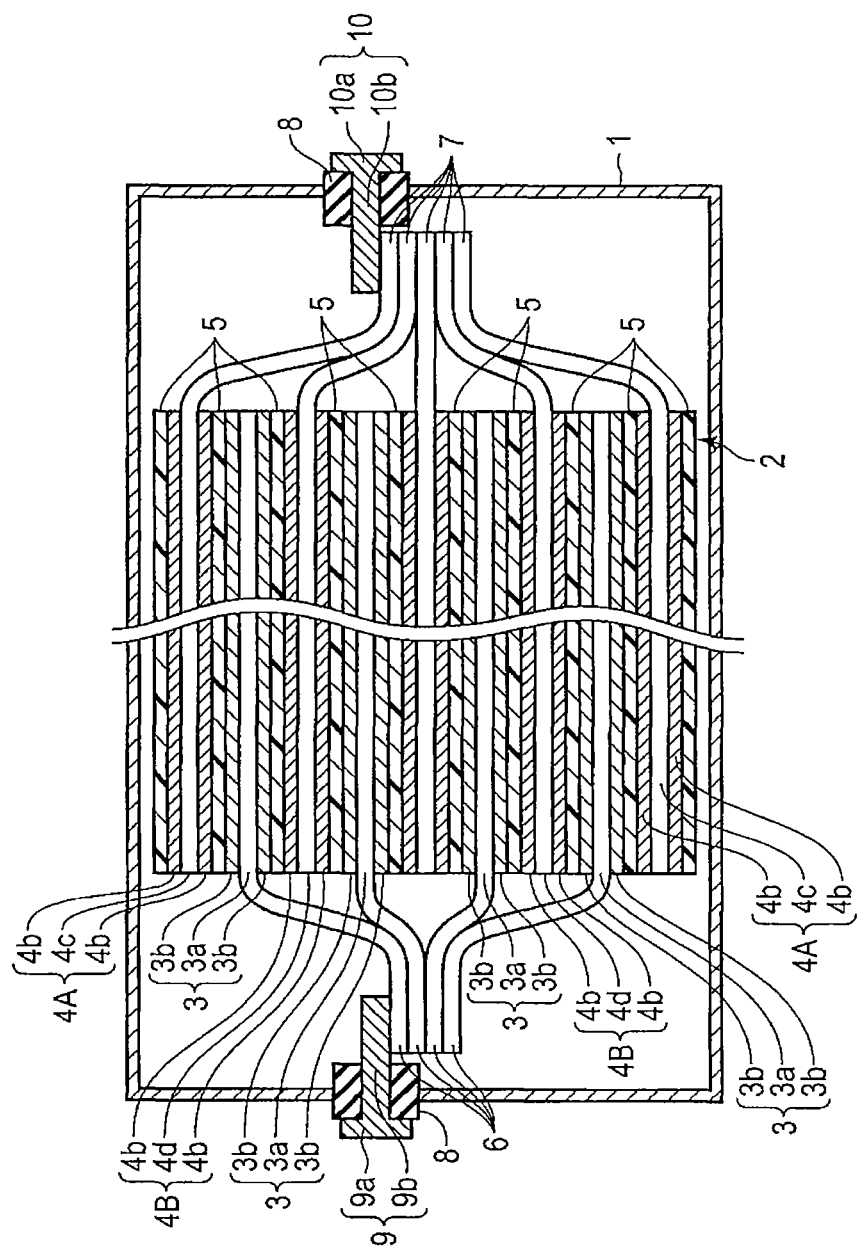
FIG. 1 is a sectional view of a nonaqueous electrolyte battery according to a first embodiment.

As illustrated in FIG. 1, a case 1 having a nearly rectangular shape and is formed of, for example, a metal material. Examples of the metal material include aluminum and aluminum alloys. An electrode group 2 is housed inside of the case 1. The electrode group 2 is obtained by stacking a combination of a positive electrode 3 and a negative electrode 4 with a separator 5 interposed therebetween. Each of both outermost layers of the electrode group 2 is formed of the separator 5. The positive electrode 3 includes a positive electrode current collector 3a and a layered positive electrode active material-containing part 3b held on each of both sides of the positive electrode current collector 3a. As illustrated in FIG. 2, the positive electrode current collector 3a is drawn in a strip from one short side of the positive electrode 3 and the drawn part works as a positive electrode tab 6.

The negative electrode 4 includes a first negative electrode part 4A and a second negative electrode part 4B. The first negative electrode part 4A is in contact with the separator 5 of the outermost layer. The first negative electrode part 4A is disposed more outside of the electrode group than the second negative electrode part 4B. Accordingly, the first negative electrode part 4A is disposed in the vicinity of a case than the second negative electrode part 4B.

The first negative electrode part 4A includes a first metal substrate 4c as a current collector and a layered negative electrode active material-containing part 4b held on each of both sides of the first metal substrate 4c. The second negative electrode part 4B includes a second metal substrate 4d as a current collector and a layered negative electrode active material-containing part 4b held on each of both sides of the second metal substrate 4d. Each of the first metal substrate 4c and the second metal substrate 4d is drawn in a strip from one short side of the negative electrode 4 and the drawn part works as a negative electrode tab 7. The positive electrode tabs 6, respectively, are drawn from one short side of the electrode group 2, and the negative electrode tabs 7, respectively, are drawn from the other short side of the electrode group 2. The tensile strength of the first metal substrate 4c is larger than the tensile strength of the second metal substrate 4d.

On each of both side surfaces of the case 1 that face each other, a through-hole is formed. To each of two through-holes, an insulating member 8 is disposed. As illustrated in FIG. 3, the insulating member 8 is a near parallelepiped block having a slit 8a in the vicinity of a center. A positive electrode terminal 9 has a rectangular head 9a and a rectangular columnar shaft part 9b extended from the head 9a. The head 9a of the positive electrode terminal 9 is disposed on the insulating member 8 protruded outside of the case 1. Further, the shaft part 9b of the positive electrode terminal 9 penetrates through the slit 8a of the insulating member 8 and protrudes inside of the case 1. On the other hand, as illustrated in FIG. 1, a negative electrode terminal 10 has a rectangular head 10a and a rectangular columnar shaft part 10b extended from the head 10a. The head 10a of the negative electrode terminal 10 is disposed on the insulating member 8 protruded outside of the case 1. Further, a shaft part 10b of the negative electrode terminal 10 penetrates through the slit 8a of the insulating member 8 and protrudes inside of the case 1. The positive electrode terminal 9 and the negative electrode terminal 10 can be formed from a conductive material. Examples of the conductive material include aluminum, aluminum alloys, and copper.

A plurality of sheets of the positive electrode tab 6 are stacked, and the stacked sheets are welded to the shaft part 9b of the positive electrode terminal 9. Further, a plurality of sheets of the negative electrode tab 7 are stacked, and the stacked sheets are welded to the shaft part 10b of the negative electrode terminal 10. Methods of welding include a resistance welding method and an ultrasonic welding method. A nonaqueous electrolyte is held by the electrode group 2.

In FIG. 1, on each of both sides of the current collector, the active material-containing part is formed. However, without being restricted thereto, only on one side of the metal substrate of the current collector, the active material-containing part may be formed. Further, in FIG. 1, only the negative electrode in contact with the separator 5 of the outermost layer is defined as the first negative electrode part 4A. However, without being restricted thereto, for example, as illustrated in FIG. 4, a part of the second negative electrode part 4B may be changed to the first negative electrode part 4A.

In what follows, the respective members contained in the non-aqueous electrolyte battery will be described.
1) Negative Electrode The negative electrode 4 includes the first negative electrode part 4A and the second negative electrode part 4B.

The tensile strength is measured by use of a tensile test machine according to JIS B7721 (2009), under conditions of a test temperature of 25° C., a width of a test piece of 10 mm, a distance between upper and lower fixed points of 50 mm, and a tensile speed of 10 mm/min or less, to measure the point at which the test piece breaks.

The reason why the tensile strength of the first metal substrate 4c of the first negative electrode part 4A is set larger than that of the second metal substrate 4d of the second negative electrode part 4B will be described. When a plurality of sheets of negative electrode tab 7 extended from an end surface of the laminated electrode group 2 are welded en-block to one negative electrode terminal 10, a large tensile force is applied to the negative electrode tab 7 of the negative electrode in the vicinity of the outermost layer of the electrode group 2. In the case where a part of the first negative electrode part 4A is disposed more outside of the electrode group than a part of the second negative electrode part 4B, when the tensile strength of the first metal substrate 4c is equal to or less than the tensile strength of the second metal substrate 4d, due to the tensile force applied to the negative electrode tab 7 upon welding the negative electrode tab 7 to the negative electrode terminal 10, the metal substrate in the vicinity of the outermost layer of the electrode group 2 may break. By setting the tensile strength of the first metal substrate 4c larger than that of the second metal substrate 4d, upon welding the negative electrode tab 7 to the negative electrode terminal 10, the metal substrate can be inhibited from fracturing.

The tensile strengths of the first and second metal substrates 4c and 4d desirably satisfy the relationship of the following equation (1).

$$X_2 \times 1.5 \leq X_1 \tag{1}$$

In the equation, $X_1$ represents the tensile strength (N/mm) of the first metal substrate 4c, and $X_2$ represents the tensile strength (N/mm) of the second metal substrate 4d.

When the tensile strengths of the first and second metal substrates 4c and 4d satisfy the relationship of the equation (1), the metal substrate can be inhibited from fracturing, and a merit of overcoming an increase in cost due to use of two kinds of metal substrates can be obtained.

The tensile strengths of the first and second metal substrates 4c and 4d are preferably adjusted by changing a material used in the metal substrate. The tensile strength of the metal substrate can be adjusted also by changing a thickness or an aperture ratio of the metal substrate. However, when the tensile strength is enhanced by making the metal substrate thicker, a thickness of the active material-containing part formed on a thick part of the metal substrate has to be made thinner, thus there is a fear that high energy density may not be obtained. Further, when the aperture ratio of the metal substrate is increased to make the tensile strength lower, when a metal foil is used as the metal substrate, the mechanical strength of the metal substrate is remarkably deteriorated, which makes it difficult to prepare a negative electrode.

When a metal substrate the main component of which is aluminum is used as the second metal substrate 4d, as the first metal substrate 4c, a metal substrate that mainly contains an aluminum alloy or copper can be used. Further, when a metal substrate that contains an aluminum alloy as a main component is used as the second metal substrate 4d, a metal substrate that contains copper as a main component can be used as the first metal substrate 4c. Because copper has a higher shearing strength than aluminum, copper can be suitably used as the first metal substrate 4c. Here, the main component means an element the content of which is 99% by mass or more among constituent elements.

The aluminum is desirably 1000 series aluminum (JIS number: 1000 series). Examples of the aluminum alloy include JIS 2000 series, 3000 series, 4000 series, 5000 series, 6000 series and 7000 series alloys. The aluminum alloy preferably contains at least one kind of element selected from the group consisting of Mg, Ti, Zn, Mn, Fe, Cu and Si.

The thicknesses of the first and second metal substrates 4c and 4d can be set to 10 μm or more and 50 μm or less. A more preferable range is 20 μm or more and 50 μm or less. The thicknesses of the first and second metal substrates 4c and 4d can be adjusted in accordance with the kind of a material used in the metal substrate so that the tensile strength of the first metal substrate is larger than the tensile strength of the second metal substrate.

The negative electrode tab 7 can be formed of the same material as that of the negative electrode current collector.

Examples of the negative electrode active material contained in the negative electrode active material-containing part include metal oxides, metal sulfides, metal nitrides, and alloys. The negative electrode active material desirably has a lithium absorption and release potential nobler by 1.0 V (vs. Li/Li$^+$) or more. In the case where the metal substrate contains aluminum or an aluminum alloy, when for example a carbonaceous substance that absorbs lithium at a lower potential than 1.0 V (vs. Li/Li$^+$) is used, the metal substrate may be electrochemically unstable. The lithium absorption and release potential of the negative electrode active material is desirably not more than 3 V (vs. Li/Li$^+$) to make a battery voltage higher.

A negative electrode active material the lithium absorption and release potential of which are nobler by 1.0 V (vs. Li/Li$^+$) or more is preferably a titanium-containing metal oxide. The titanium-containing metal oxide absorbs lithium in the vicinity of 1.5 V (vs. Li/Li$^+$); accordingly, the metal substrate containing aluminum or an aluminum alloy can be inhibited from dissolving.

Examples of the titanium-containing metal oxide include lithium-titanium oxides such as cubic spinel $Li_{4+x}Ti_5O_{12}$ ($0 \leq x \leq 3$) and orthorhombic ramsdellite $Li_{2+y}Ti_3O_7$ ($0 \leq y \leq 3$), and lithium-titanium composite oxides in which a constituent element of lithium-titanium oxide is partially substituted with a different kind of element. From the viewpoint of the charge/discharge cycle life, the cubic spinel lithium-titanium oxide that is small in the lattice volume change owing to lithium absorption and release is preferred.

Other examples of the negative electrode active material include lithium-niobium composite oxides such as $Li_xNb_2O_5$ ($0 \leq x \leq 2$) and $Li_xNbO_3$ ($0 \leq x \leq 1$), the lithium absorption and release potential of which are 1 to 2 V (vs. Li/Li$^+$), lithium molybdenum composite oxide such as $Li_xMoO_3$ ($0 \leq x \leq 1$), the lithium absorption and release potential of which are 2 to 3 V (vs. Li/Li$^+$), and lithium-iron composite sulfides such as $Li_xFeS_2$ ($0 \leq x \leq 4$), the lithium absorption and release potential of which are 1.8 V (vs. Li/Li$^+$).

Further, as the negative electrode active material, titanium oxide such as $TiO_2$, or metal composite oxides that contain Ti and at least one kind of element selected from the group consisting of P, V, Sn, Cu, Ni, Co and Fe can be used. These oxides absorb lithium during the first charge and become lithium-titanium composite oxides. $TiO_2$ that has a monoclinic β form (also called as bronze form or $TiO_2$ (B)), is heat treated at a temperature from 300 to 500° C., and has low crystallinity is preferable.

Examples of metal composite oxides that contain Ti and at least one kind of element selected from the group consisting of P, V, Sn, Cu, Ni, Co and Fe include $TiO_2$—$P_2O_5$, $TiO_2$—$V_2O_5$, $TiO_2$—$P_2O_5$—$SnO_2$ and $TiO_2$—$P_2O_5$-MeO (Me is at least one kind of element selected from the group consisting of Cu, Ni, Co and Fe). In the metal composite oxides, a microstructure where a crystalline phase and an amorphous phase coexist or an amorphous phase alone exists is preferred. By use of such a microstructure, the cycle performance can be greatly improved.

In the negative electrode active material, the active materials cited above may be used singularly or in a mixture thereof.

As other components contained in the negative electrode active material-containing part, a binder and a conductive agent are cited.

The conductive agent enhances a current collecting property of the active material and suppresses the contact resistance with the current collector. Examples of the conductive agent include acetylene black, carbon black, and graphite.

The binder can bind the active material and the conductive agent. Examples of the binder include polytetrafluoroethylene (PTFE), polyvinylidene fluoride (PVdF), a fluororubber and a styrene-butadiene rubber.

The active material, the conductive agent, and the binder are preferably mixed in the negative electrode active material-containing part at a ratio of 70 to 96% by mass, 2 to 28% by mass, and 2 to 28% by mass, respectively. When an amount of the conductive agent is set to 2% by mass or more, the current collecting performance of the negative electrode active material-containing part can be improved, and the large current characteristics of the non-aqueous electrolyte battery can be improved. Further, when an amount of the binder is set to 2% by mass or more, the binding property between the negative electrode active material-containing part and the current collector can be enhanced and the cycle characteristics can be improved. On the other hand, it is preferable to set an amount of each of the conductive agent and binder to 28% by mass or less from the viewpoint of obtaining higher capacity.

A method for preparing a negative electrode will be described. The active material, conductive agent, and binder are suspended in a solvent to prepare a slurry. The slurry is coated on the first metal substrate, dried, and then pressed to obtain a first electrode part. Further, the slurry is coated on the second metal substrate, dried, and then pressed to obtain a second electrode part. In place of preparation of the slurry, the active material, conductive agent and binder may be formed in pellet form as a negative electrode active material-containing part on each of the first metal substrate and second metal substrate, thus obtaining a first electrode part and a second electrode part.

2) Positive Electrode

The positive electrode 3 contains the positive electrode current collector 3a, and the positive electrode active material-containing part 3b held by the positive electrode current collector 3a. In FIG. 1, on both sides of the positive electrode current collector, the positive electrode active material-containing part is formed. However, without being restricted thereto, the positive electrode active material-containing part may be formed only on one side of the positive electrode current collector.

Examples of positive electrode active materials include oxides and polymers.

Examples of the oxides include lithium-absorbed manganese dioxide ($MnO_2$), iron oxide, copper oxide, nickel oxide, and, lithium-manganese composite oxides (for example, $Li_xMn_2O_4$ or $Li_xMnO_2$), lithium-nickel composite oxides (for example, $Li_xNiO_2$), lithium-cobalt composite oxides (for example, $Li_xCoO_2$), lithium-nickel-cobalt composite oxides (for example, $LiNi_{1-y}Co_yO_2$), lithium-manganese-cobalt composite oxides (for example, $LiMn_yCo_{1-y}O_2$), spinel lithium-manganese-nickel composite oxides ($Li_xMn_{2-y}Ni_yO_4$), lithium phosphate having an olivine structure ($Li_xFePO_4$, $Li_xFe_{1-y}Mn_yPO_4$, $Li_xCoPO_4$ and so on), iron sulfate ($Fe_2(SO_4)_3$), vanadium oxides (for example, $V_2O_5$) and so on.

Examples of the polymers include conductive polymer materials such as polyaniline and polypyrrole, and disulfide polymer materials. Other than these, sulfur (S) and fluorocarbon can be used.

Examples of preferable positive electrode active materials include lithium-manganese composite oxides ($Li_xMn_2O_4$), lithium-nickel composite oxides ($Li_xNiO_2$), lithium-cobalt composite oxides ($Li_xCoO_2$), lithium-nickel-cobalt composite oxides ($Li_xNi_{1-y}Co_yO_2$), spinel lithium-manganese-nickel composite oxides ($Li_xMn_{2-y}Ni_yO_4$), Lithium-manganese-cobalt composite oxides ($Li_xMn_yCo_{1-y}O_2$), and lithium-iron phosphate ($Li_xFePO_4$), all of which have a high positive electrode potential. In the composition formulas, x and y are preferably in the range of 0 to 1.

As other components that the positive electrode active material-containing part can contain, a binder and a conductive agent can be cited.

The conductive agent enhances a current collecting property of the active material and suppresses the contact resistance with the current collector. Examples of the conductive agent include carbonaceous materials such as acetylene black, carbon black, and graphite.

The binder binds the active material and the conductive agent. Examples of the binder include polytetrafluoroethylene (PTFE), polyvinylidene fluoride (PVdF), and a fluororubber.

The active material, the conductive agent, and the binder are mixed in the positive electrode active material-containing part preferably at a ratio of 80 to 95% by mass, 3 to 18% by mass, and 2 to 17% by mass, respectively. When an amount of the conductive agent is set to 3% by mass or more, the abovementioned effect (the current collecting performance of the active material is enhanced, and the contact resistance with the current collector is suppressed) can be exerted. When an amount of the conductive agent is set to 18% by mass or less, the nonaqueous electrolyte can be reduced in decomposition on a surface of the conductive agent under high temperature storage. When an amount of the binder is set to 2% by mass or more, a higher positive electrode strength can be obtained. When an amount of the binder is set to 17% by mass or less, a blending amount of the binder that is an insulating material in the positive electrode can be reduced and the internal resistance can be reduced.

The positive electrode current collector is preferably an aluminum foil, or an aluminum alloy foil containing at least one kind of element selected from the group consisting of Mg, Ti, Zn, Mn, Fe, Cu and Si.

The positive electrode tab 6 can be formed of the same material as that of the positive electrode current collector.

The positive electrode is prepared in such a manner that, for example, the active material, conductive agent, and binder are suspended in a solvent to prepare a slurry, and the slurry is coated on the current collector, dried, and then pressed to prepare a positive electrode. The active material, conductive agent and binder may be formed in pellet form as a positive electrode active material-containing part on the current collector, thus obtaining a positive electrode.

3) Separator

As the separator, for example, porous films containing polyethylene, polypropylene, cellulose, or polyvinylidene fluoride (PVdF), or synthetic resin nonwoven fabrics can be used. Examples of preferable porous films include porous films containing polyethylene or polypropylene. The porous film like this can be melted at a definite temperature to interrupt current; accordingly, it can improve the safety.

4) Nonaqueous Electrolyte

As the nonaqueous electrolyte, a liquid nonaqueous electrolyte prepared, for example, by dissolving an electrolyte in an organic solvent, or a gel-like nonaqueous electrolyte obtained by forming a composite from a liquid electrolyte and a polymer material can be used.

The liquid nonaqueous electrolyte is preferably obtained by dissolving an electrolyte in an organic solvent at a concentration of 0.5 to 2.5 M.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bis(trifluoromethylsulfonylimide) [$LiN(CF_3SO_2)_2$], or mixtures thereof. The electrolyte that is difficult to oxidize even under high potential is preferable, $LiPF_6$ being the most preferable.

Examples of the organic solvent include: cyclic carbonates such as propylene carbonate (PC), ethylene carbonate (EC), and vinylene carbonate; chain carbonates such as diethyl carbonate (DEC), dimethyl carbonate (DMC), and methyl ethyl carbonate (MEC); cyclic ethers such as tetrahydrofuran (THF), 2-methyltetrahydrofuran (2MeTHF), and dioxolane (DOX); chain ethers such as dimethoxyethane (DME) and diethoxyethane (DEE); or γ-butylolactone (GBL), acetonitrile (AN), and sulfolane (SL). These organic solvents may be used singularly or in a form of mixture thereof.

Examples of the polymer material include polyvinylidene fluoride (PVdF), polyacrylonitrile (PAN) and polyethylene oxide (PEO).

Examples of the preferable organic solvent include mixed solvents obtained by mixing at least two or more of the group of propylene carbonate (PC), ethylene carbonate (EC) and diethyl carbonate (DEC), or mixed solvents containing γ-butylolactone (GBL). When these mixed solvents are used, a non-aqueous electrolyte secondary battery excellent in the high-temperature characteristics can be obtained.

5) Case

As the case, a metal container as shown in FIG. 1 can be used. A thickness of the metal container is preferably set to 1.0 mm or less. A more preferable range is 0.5 mm or less. Alternatively, in place of the metal container, a laminate film container can be used. A thickness of the laminate film container is desirably 0.5 mm or less.

A shape of the case is not restricted to a square type shown in FIG. 1. For example, a flat type (thin type), a cylinder type, a coin type, and a button type can be used. Examples of the case include, in accordance with a dimension of a battery, a case for small batteries, which is mounted on, for example, portable electronic instruments, and a case for large batteries, which is mounted on 2 wheel or 4 wheel automobiles.

As the laminate film, a multilayered film in which a metal layer is interposed between resin layers is used. The metal layer is preferably an aluminum foil or an aluminum alloy foil from the viewpoint of weight saving. In the resin layer, polymer materials such as polypropylene (PP), polyethylene (PE), nylon, and polyethylene terephthalate (PET) can be used. The laminate film can be formed into a shape of the case by heat sealing.

The metal container is formed of aluminum or an aluminum alloy. As the aluminum alloy, alloys containing elements such as magnesium, zinc, and silicon are preferred. When transition metals such as iron, copper, nickel, and chromium are contained, an amount thereof is preferably set to 100 ppm by mass or less.

According to the first embodiment described above, a part of the first negative electrode part is provided more outside of the electrode group than a part of the second negative electrode part, and the tensile strength of the first metal substrate of the first negative electrode part is larger than the tensile strength of the second metal substrate of the second negative electrode part; accordingly, when the negative electrode tab provided to each of the first metal substrate and the second metal substrate is welded to the negative electrode terminal, the metal substrate can be inhibited from fracturing. As the result thereof, irrespective of the thickness of the metal substrate, a decrease in battery capacity and an increase in the internal resistance which are generated by fracture of the metal substrate can be avoided; accordingly, a non-aqueous electrolyte battery having high energy density can be realized.

Second Embodiment

According to a second embodiment, a non-aqueous electrolyte battery that includes a case, and a laminated electrode group that is housed in the case and contains a positive electrode and a negative electrode is provided. The second embodiment has a configuration the same as that of the first embodiment except that both of a positive electrode and a negative electrode have a first electrode part and a second electrode part.

Figure 5:
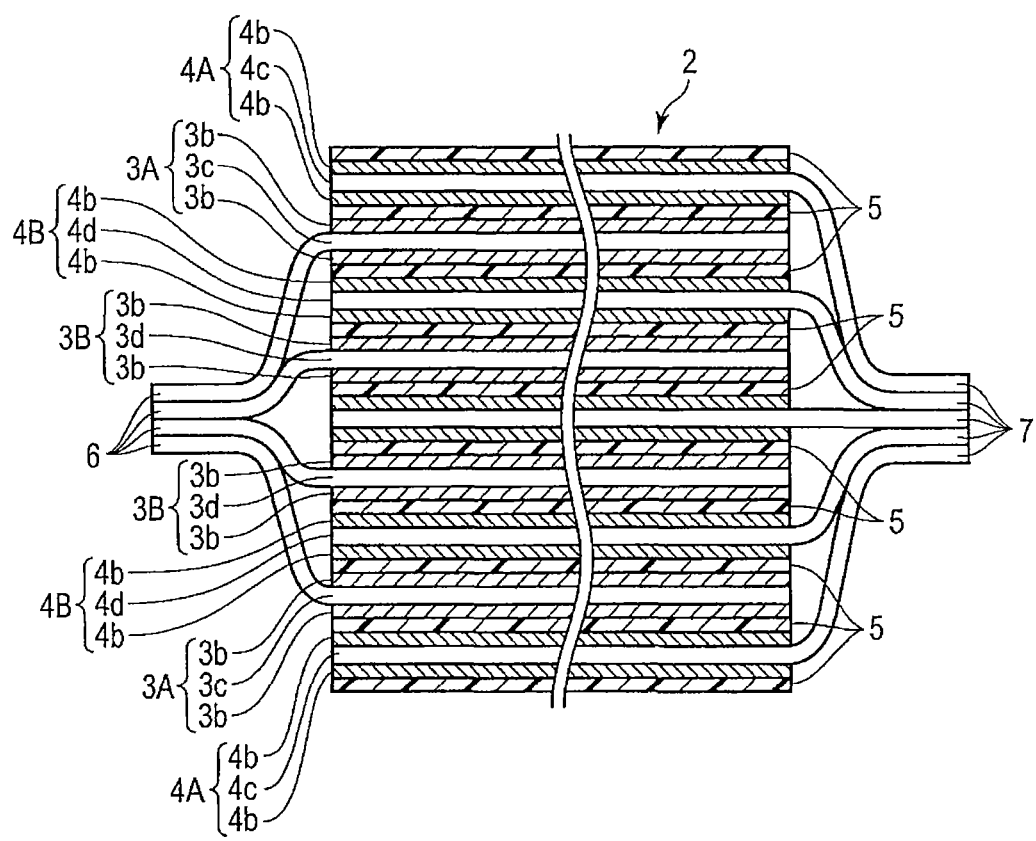
FIG. 5 is a sectional view of an electrode group of a nonaqueous electrolyte battery according to a second embodiment.

A non-aqueous electrolyte battery according to the second embodiment can have a structure the same as FIG. 1 except that, for example, an electrode group shown in FIG. 5 is provided. Like reference numerals denote like members with FIGS. 1 to 4 and description thereof will be omitted.

A positive electrode 3 has a first positive electrode part 3A and a second positive electrode part 3B. The first positive electrode part 3A faces a first negative electrode part 4A via a separator 5. The first positive electrode part 3A is positioned more outside than the second positive electrode part 3B. Accordingly, the first positive electrode part 3A is disposed in the vicinity of a case than the second positive electrode part 3B. The first positive electrode part 3A contains a first metal substrate 3c as a current collector and a layered positive electrode active material-containing part 3b held on both sides of the first metal substrate 3c. The second positive electrode part 3B contains a second metal substrate 3d as a current collector and a layered positive electrode active material-containing part 3b held on both sides of the second metal substrate 3d. The tensile strength of the first metal substrate 3c is larger than the tensile strength of the second metal substrate 3d. The first metal substrate 3c and the second metal substrate 3d, respectively, are drawn in a strip from one short side of the positive electrode 3, and the drawn part works as a positive electrode tab 6.

The first and second metal substrates of the positive electrode will be described next.

The tensile strength of each of the first and second metal substrates of the positive electrode is measured in the same manner as that described in the first embodiment.

The reason why the tensile strength of the first metal substrate 3c is made larger than that of the second metal substrate 3d will be described. When a plurality of sheets of positive electrode tab 6 extended from an end surface of a laminated electrode group 2 are welded en-block to a positive electrode terminal 9, in some cases, a large tensile force is applied to the positive electrode tab of the positive electrode in the vicinity of the outermost layer of the electrode group 2. Accordingly, a part of the first positive electrode part 3A is located more outside than a part of the second positive electrode part 3B, and the tensile strength of the first metal substrate 3c is made larger than the tensile strength of the second metal substrate 3d, thereby when the positive electrode tab 6 is welded to the positive electrode terminal 9, the metal substrate can be inhibited from fracturing.

The tensile strengths of the first and second metal substrates 3c, 3d desirably satisfy the relationship of the following equation (2).

$$Y_2 \times 1.5 \leq Y_1 \quad (2)$$

In the equation, $Y_1$ denotes the tensile strength (N/mm) of the first metal substrate 3c, and $Y_2$ denotes the tensile strength (N/mm) of the second metal substrate 3d.

When the tensile strengths of the first and second metal substrate 3c, 3d satisfy the relationship of the equation (2), an effect of inhibiting the metal substrate from fracturing can be enhanced, and when two kinds of the metal substrates are used, a merit of overcoming an increase in the process cost can be obtained.

The tensile strengths of the first and second metal substrates 3c, 3d are preferably adjusted by changing a material used for the metal substrate. The tensile strength of the metal substrate can be adjusted also by changing, for example, a thickness or an aperture ratio of the metal substrate. However, when a thickness of the metal substrate is made thicker to enhance the tensile strength, a thickness of the active material-containing part formed on a thick portion of the metal substrate has to be made thinner, thus there is a fear that high energy density cannot be obtained. Further, in the case where the aperture ratio of the metal substrate is made larger to reduce the tensile strength, when a metal foil is used as the metal substrate, the mechanical strength of the metal substrate is remarkably reduced, thus making it impossible to prepare the positive electrode.

When a metal substrate mainly made of aluminum is used as the second metal substrate 3d, as the first metal substrate 3c, a metal substrate that mainly contains an aluminum alloy can be used. Here, aluminum is desirably 1000 series aluminum (JIS No.: 1000 series). As the aluminum alloys, alloys of, for example, JIS 2000 series, 3000 series, 4000 series, 5000 series, 6000 series or 7000 series can be used. The aluminum alloy preferably contains at least one kind of element selected from the group consisting of Mg, Ti, Zn, Mn, Fe, Cu and Si.

Thicknesses of the first and second metal substrates 3c, 3d can be set to 10 μm or more and 50 μm or less. A more preferable range thereof is 20 μm or more and 50 μm or less. A thickness of each of the first and second metal substrates 3c, 3d can be adjusted in accordance with the kind of material used in the metal substrate so that the tensile strength of the first metal substrate is larger than that of the second metal substrate.

According to the second embodiment described above, a part of the first negative electrode part 4A is disposed more outside than a part of the second negative electrode part 4B, and a part of the first positive electrode part 3A is disposed more outside than a part of the second positive electrode part 3B. The tensile strengths of the first metal substrate of each of the first negative electrode part 4A and the first positive electrode part 3A is larger than the tensile strength of each of the second negative electrode part 4B and the second positive electrode part 3B. As the result thereof, in both of the positive electrode and negative electrode, when a tab provided to each of the first metal substrate and second metal substrate is welded to a terminal, the metal substrate can be inhibited from fracturing. As the result thereof, irrespective of the thickness of the metal substrate, a decrease in battery capacity and an increase in the internal resistance which are generated by fracture of the metal substrate can be assuredly avoided;

accordingly, a non-aqueous electrolyte battery having high energy density can be realized.

Third Embodiment

According to a third embodiment, a non-aqueous electrolyte battery that includes a case, and a laminated electrode group that is housed inside of the case and contains a positive electrode and a negative electrode is provided. In the third embodiment, an electrode having a first electrode part and a second electrode part is a positive electrode.

Figure 6:
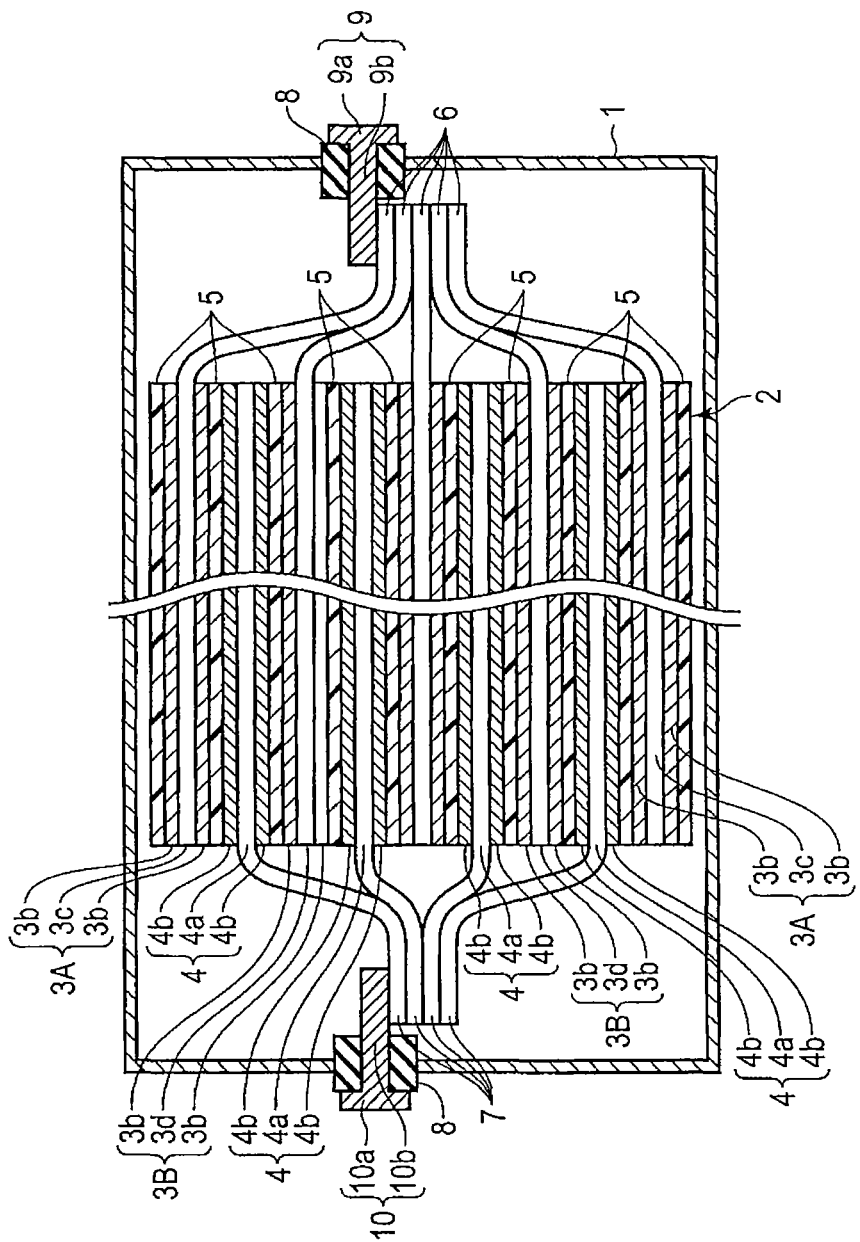
FIG. 6 is a sectional view of a nonaqueous electrolyte battery according to a third embodiment.

An example of a battery according to the third embodiment is shown in FIG. 6. In FIG. 6, like reference numerals denote like members in FIGS. 1 to 5, and description thereof is omitted.

A positive electrode 3 has a first positive electrode part 3A and a second positive electrode part 3B. The first positive electrode part 3A is in contact with a separator 5 of the outermost layer. The first positive electrode part 3A is positioned more outside than the second positive electrode part 3B. Accordingly, more of the first positive electrode part 3A is disposed in the vicinity of the case than the second positive electrode part 3B. Further, the tensile strength of a first metal substrate 3c is larger than the tensile strength of a second metal substrate 3d.

A negative electrode 4 includes a negative electrode current collector 4a, and a layered negative electrode active material-containing part 4b held on both sides of the negative electrode current collector 4a. The negative electrode current collector 4a is drawn in a strip from one short side of the negative electrode 4, and the drawn part works as a negative electrode tab 7. As the negative electrode current collector, a copper foil, an aluminum foil, or an aluminum alloy foil containing at least one or more kinds of elements selected from the group of Mg, Ti, Zn, Mn, Fe, Cu and Si can be used.

In FIG. 6, only a positive electrode in contact with the separator 5 of the outermost layer is denoted as the first positive electrode part 3A. However, without being restricted thereto, a part of the second positive electrode part 3B can be changed to the first positive electrode part 3A.

According to the third embodiment described above, a part of the first positive electrode part is disposed more outside of the electrode group than a part of the second positive electrode part, and the tensile strength of the first metal substrate is larger than the tensile strength of the second metal substrate; accordingly, when the positive electrode tab provided to each of the first metal substrate and the second metal substrate is welded to the positive electrode terminal, the metal substrate can be inhibited from fracturing. As the result thereof, irrespective of the thickness of the metal substrate, a decrease in battery capacity and an increase in the internal resistance which are generated by fracture of the metal substrate can be avoided; accordingly, a non-aqueous electrolyte battery having high energy density can be realized.

Fourth Embodiment

According to a fourth embodiment, a non-aqueous electrolyte battery that includes a case, and a laminated electrode group that is housed inside of the case and contains a positive electrode and a negative electrode is provided. The fourth embodiment has a configuration the same as that of the third embodiment except that also a negative electrode has a first electrode part and a second electrode part.

Figure 7:
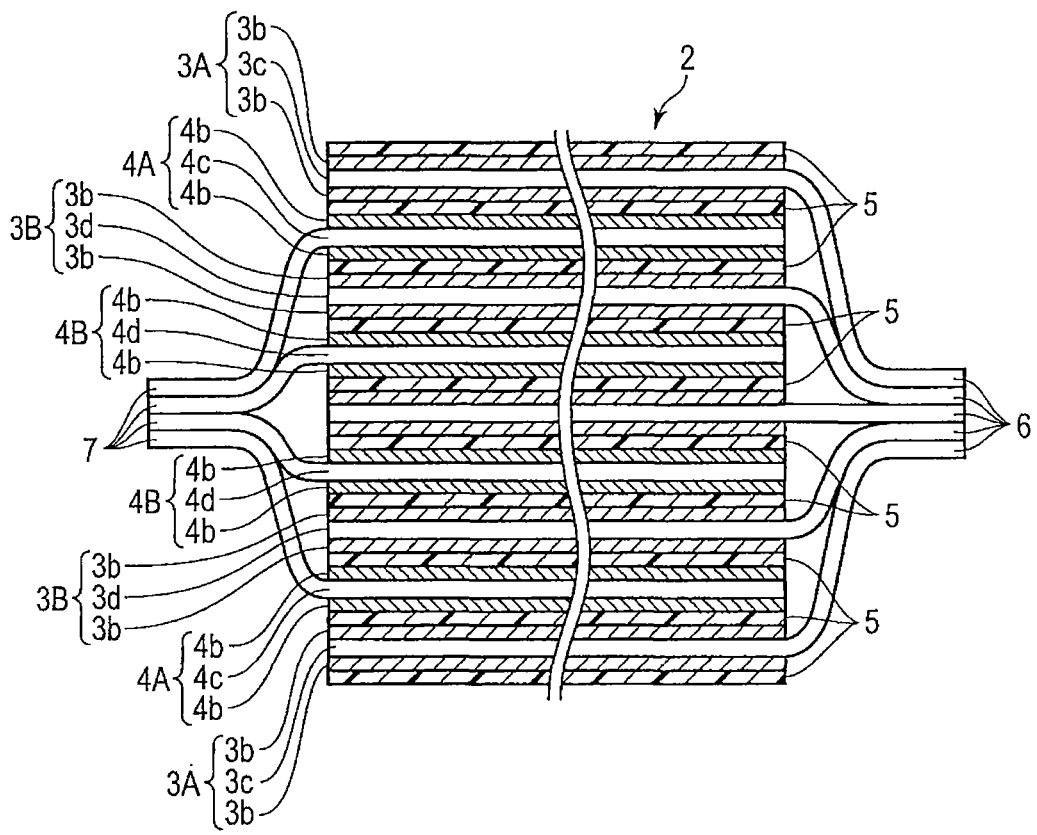
FIG. 7 is a sectional view of an electrode group of a nonaqueous electrolyte battery according to a fourth embodiment.

A non-aqueous electrolyte battery according to the fourth embodiment can be formed into a structure the same as that of FIG. 6 except that, for example, an electrode group shown in FIG. 7 is provided. Like reference numerals denote like members in FIGS. 1 to 6, and description thereof will be omitted.

A positive electrode 3 has a first positive electrode part 3A and a second positive electrode part 3B. The first positive electrode part 3A is in contact with a separator 5 of the outermost layer. The first positive electrode part 3A is positioned more outside than the second positive electrode part 3B. Accordingly, the first positive electrode part 3A is disposed in the vicinity of the case than the second positive electrode part 3B. Further, the tensile strength of a first metal substrate 3c is larger than the tensile strength of a second metal substrate 3d.

A negative electrode 4 has a first negative electrode part 4A and a second negative electrode part 4B. The first negative electrode part 4A faces the first positive electrode part 3A via the separator 5. The first negative electrode part 4A is positioned more outside than the second negative electrode part 4B. Accordingly, more of the first negative electrode part 4A is disposed in the vicinity of the case than the second negative electrode part 4B. The tensile strength of a first metal substrate 4c is larger than the tensile strength of a second metal substrate 4d.

According to the fourth embodiment described above, a part of the first negative electrode part 4A is disposed more outside than a part of the second negative electrode part 4B, and a part of the first positive electrode part 3A is disposed more outside than a part of the second positive electrode part 3B. The tensile strength of the first metal substrate of each of the first negative electrode part 4A and the first positive electrode part 3A is larger than the tensile strength of each of the second negative electrode part 4B and the second positive electrode part 3B. As the result thereof, in both of the positive electrode and negative electrode, when a tab provided to each of the first metal substrate and second metal substrate is welded to a terminal, the metal substrate can be inhibited from fracturing. As the result thereof, irrespective of the thickness of the metal substrate, a decrease in battery capacity and an increase in the internal resistance which are generated by fracture of the metal substrate can be assuredly avoided; accordingly, a non-aqueous electrolyte battery having high energy density can be realized.

Fifth Embodiment

According to a fifth embodiment, a non-aqueous electrolyte battery that includes a case, and an electrode group that is housed inside of the case and contains a positive electrode and a negative electrode is provided. In the electrode group, a positive electrode, a negative electrode and a separator are wound in a flat spiral. At least one of the positive electrode and negative electrode has a first electrode part and a second electrode part.

Figure 8:
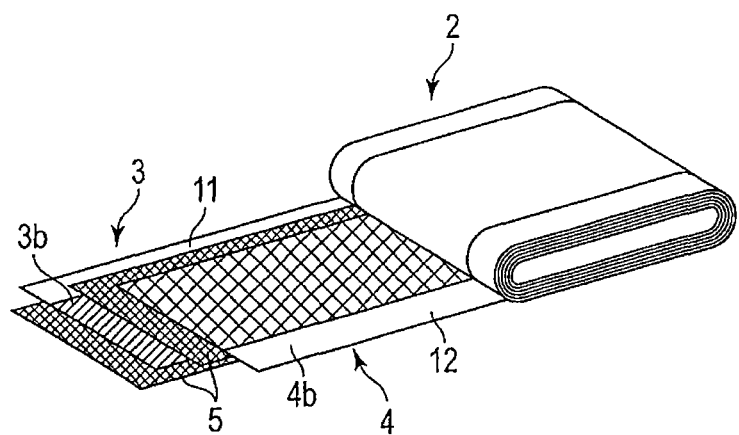
FIG. 8 is a developed perspective view of an electrode group of a nonaqueous electrolyte battery according to a fifth embodiment.

An example of the fifth embodiment will be described with reference to FIGS. 8 to 11. Like reference numerals denote like members in FIGS. 1 to 7 and description thereof will be omitted. As shown in FIG. 8, a wound electrode group 2 is formed by winding a positive electrode 3 and a negative electrode 4 in a flat shape with a separator 5 interposed therebetween. The positive electrode 3 contains a strip-shaped positive electrode current collector 3a, a positive electrode collector tab 11 made of an edge part in parallel with a long side of the positive electrode current collector 3a, and a positive electrode active material-containing part 3b formed on the positive electrode current collector excluding at least the positive electrode collector tab 11. On the other hand, the negative electrode 4 contains a strip-shaped negative electrode current collector 4a, a negative electrode collector tab 12 made of an edge part in parallel with a long side of the negative electrode current collector 4a, and a negative electrode active material-containing part 4b formed on the negative electrode current collector excluding at least the negative electrode collector tab 12.

The positive electrode 3, separator 5, and negative electrode 4 are wound with the positive electrode 3 and negative electrode 4 displaced in position so that the positive electrode collector tab 11 may protrude from the separator 5 in a winding axis direction of the electrode group, and the negative electrode collector tab 12 may protrude from the separator 5 in a direction opposite thereto. By winding like this, in the electrode group 2, as shown in FIG. 9, the spiral-wound positive electrode collector tab 11 protrudes from one end surface, and the spiral-wound negative electrode collector tab 12 protrudes from the other end surface. The positive electrode collector tabs 11 are electrically connected with each other by, for example, welding. The negative electrode collector tabs 12 are electrically connected with each other by, for example, welding. The separator 5 is located on the outermost layer of the electrode group 2.

When the outermost layer of the electrode group 2 is the separator 5, the first electrode part is used as the outermost periphery of the electrode in contact with the separator 5 of the outermost layer. The other electrodes other than that of the outermost periphery may be formed from the second electrode part or may be formed from both of the first and second electrode parts. For example, when the first electrode part and the second electrode part are alternately disposed in such a manner that as an electrode in contact with the separator 5 of the outermost layer, the first electrode part is used, as an electrode in one inner periphery than the outermost periphery, the second electrode part is used, and as an electrode in one more inner periphery than the above, the first electrode part is used and so on, a part of the first electrode part can be disposed more outside than a part of the second electrode part.

Here, the outermost periphery of the electrode is a portion between a winding end part of the electrode and a portion corresponding to the end part in one inner periphery than the end part. FIG. 10 illustrates an example where as a current collector of the outermost periphery of the negative electrode 4 in contact with the separator 5 of the outermost layer, the first metal substrate 4c is used. In FIG. 10, as a matter of convenience of description, the separator 5 of the outermost layer is omitted. The outermost periphery of the negative electrode 4 is a portion between a winding end part of the negative electrode 4 and a portion corresponding to the end part in one inner periphery than the end part, and is a part shown with an arrow of FIG. 10. Since the first metal substrate 4c is used in the negative electrode current collector of the outermost periphery of the negative electrode 4, the negative electrode 4 of the outermost periphery becomes the first negative electrode part 4A. In the negative electrodes 4 other than that of the outermost periphery the second metal substrate 4d is used in the negative electrode current collector to form the second negative electrode part 4B. Among the positive electrodes 3, in the positive electrode current collector 3a of the positive electrode of the outermost periphery, the first metal substrate 3c may be used, and, in the current collector 3a of the positive electrodes other than that of the outermost periphery, the second metal substrate 3d may be used.

In FIG. 10, the electrode in contact with the separator 5 of the outermost layer is the negative electrode. However, it can be the positive electrode. In this case, the first positive electrode part is used in the outermost periphery of the positive electrode, and the positive electrodes other than those of the outermost periphery can be formed into only the second positive electrode part, or the first positive electrode part and the second positive electrode part. In this case, further, among the negative electrodes, in the negative electrode current collector of the negative electrode of the outermost periphery, the first metal substrate may be used, and in the negative electrodes other than that of the outermost periphery, the second metal substrate may be used.

Figure 11:
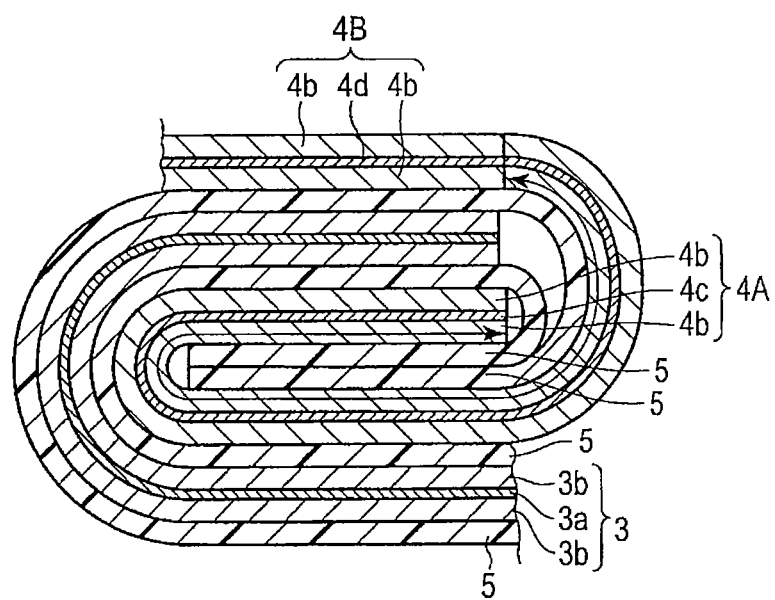
FIG. 11 is a sectional view showing an essential part of the electrode group of the nonaqueous electrolyte battery according to the fifth embodiment.

As to at least one of the positive electrode and negative electrode of the wound electrode group, when a part of the first electrode part is disposed more outside than a part of the second electrode part, the innermost periphery of the electrode of the wound electrode group can be made the first electrode part. When winding the positive electrode, negative electrode and separator, stress tends to be applied on an electrode located in the vicinity of a center of the winding. By using the first electrode part in the innermost periphery of the electrode, the current collector of the electrode can be inhibited from fracturing during winding. Here, the innermost periphery of the electrode is a portion between a winding start end part of the electrode and a portion corresponding to the end part in one outer periphery than the end part. FIG. 11 is a cross-section view of a center portion of an electrode group prepared by winding the negative electrode 4 in advance of the positive electrode 3. Since the negative electrode 4 is located nearer a center of the electrode group than the positive electrode 3, it is desirable to use the first metal substrate in the current collector of the innermost periphery of the negative electrode 4. The innermost periphery of the negative electrode 4 is a portion between a winding start end part of the negative electrode 4, and a portion corresponding to the end part in one outer periphery than the end part, and a portion shown with an arrow sign in FIG. 11. In the innermost periphery of the negative electrode 4, the first metal substrate 4c is used in the current collector and configures the first negative electrode part 4A. When the outermost periphery of the negative electrode 4 is positioned more outside than the outermost periphery of the positive electrode 3, also in the outermost periphery of the negative electrode 4, the first negative electrode part 4A is used. In this case, with the second metal substrate 4d used in the current collectors of the negative electrodes of other than the innermost periphery and the outermost periphery, the second negative electrode part 4B can be configured. On the other hand, when the outermost periphery of the positive electrode 3 is positioned more outside than the outermost periphery of the negative electrode 4, the first positive electrode part 3A is used as the positive electrode 3 of the outermost periphery. In this case, as the negative electrode of the outermost periphery, the second negative electrode part can be used.

As shown in FIG. 11, when the first negative electrode part 4A is used in the innermost periphery of the negative electrode 4, the first metal substrate 3c may be used in the positive electrode current collector 3a of the innermost peripheral positive electrode among the positive electrodes 3. In FIG. 11, an example where the negative electrode is nearer to a center of the electrode group than the positive electrode is described. However, the positive electrode as well can be disposed nearer to a center of the electrode group. In this case, the innermost periphery of the positive electrode is desirably configured of the first positive electrode part.

In FIG. 10, an example where the first electrode part is used in the outermost periphery of the electrode is described. However, without being restricted thereto, the first electrode part can be used also in an inner periphery of the electrode. Further, in FIG. 11, an example where the first electrode part is used in the innermost periphery of the electrode is described.

However, without being restricted thereto, the first electrode part can be used also in an outer periphery of the electrode.

A wound electrode group can be prepared in such a manner that, for example, after spiral winding a second electrode part and a counter electrode with a separator interposed therebetween, by using the resulting wound matter as a winding core, the first electrode part and the counter electrode are wound with the separator interposed therebetween and press molded. The first electrode part and the second electrode part are electrically connected by electrically connecting collector tabs with each other.

According to the fifth embodiment, in the wound electrode group, a part of the first electrode part is disposed more outside than a part of the second electrode part, and the tensile strength of the first metal substrate is larger than the tensile strength of the second metal substrate. As the result thereof, when a tab provided to each of the first metal substrate and second metal substrate is welded to a terminal, the metal substrate can be inhibited from fracturing. As the result thereof, irrespective of the thickness of the metal substrate, a decrease in battery capacity and an increase in the internal resistance which are generated by fracture of the metal substrate can be avoided; accordingly, a non-aqueous electrolyte battery having high energy density can be realized.

Sixth Embodiment

According to a sixth embodiment, a non-aqueous electrolyte battery includes a case, and at least one electrode group selected from the group consisting of the first to fifth embodiments which is housed in the case.

Figure 12:
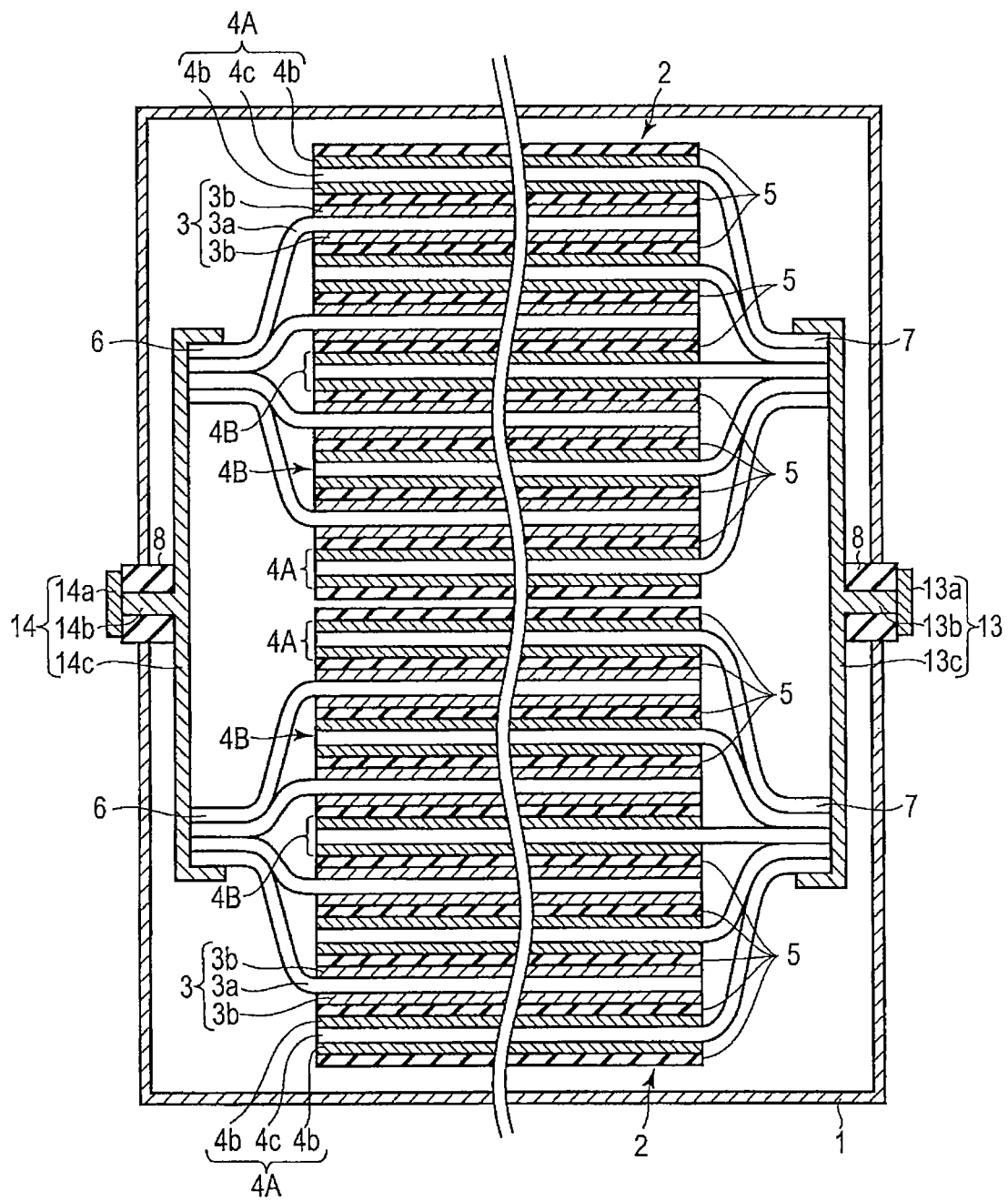
FIG. 12 is a sectional view of a nonaqueous electrolyte battery according to a sixth embodiment.

An example of a battery according to the sixth embodiment is shown in FIG. 12. In FIG. 12, like reference numerals denote like members in FIGS. 1 to 11, and description thereof will be omitted.

Inside of the case 1, a plurality of laminated electrode groups 2 are housed. The outermost layer of each of the electrode groups 2 is configured of a separator 5. A negative electrode 4 in contact with the separator 5 of the outermost layer is a first negative electrode part 4A. A negative electrode located more inside than the first negative electrode part 4A is a second negative electrode part 4B. The tensile strength of a first metal substrate 4c of the first negative electrode part 4A is larger than the tensile strength of a second metal substrate 4d of the second negative electrode part 4B.

Figure 13:
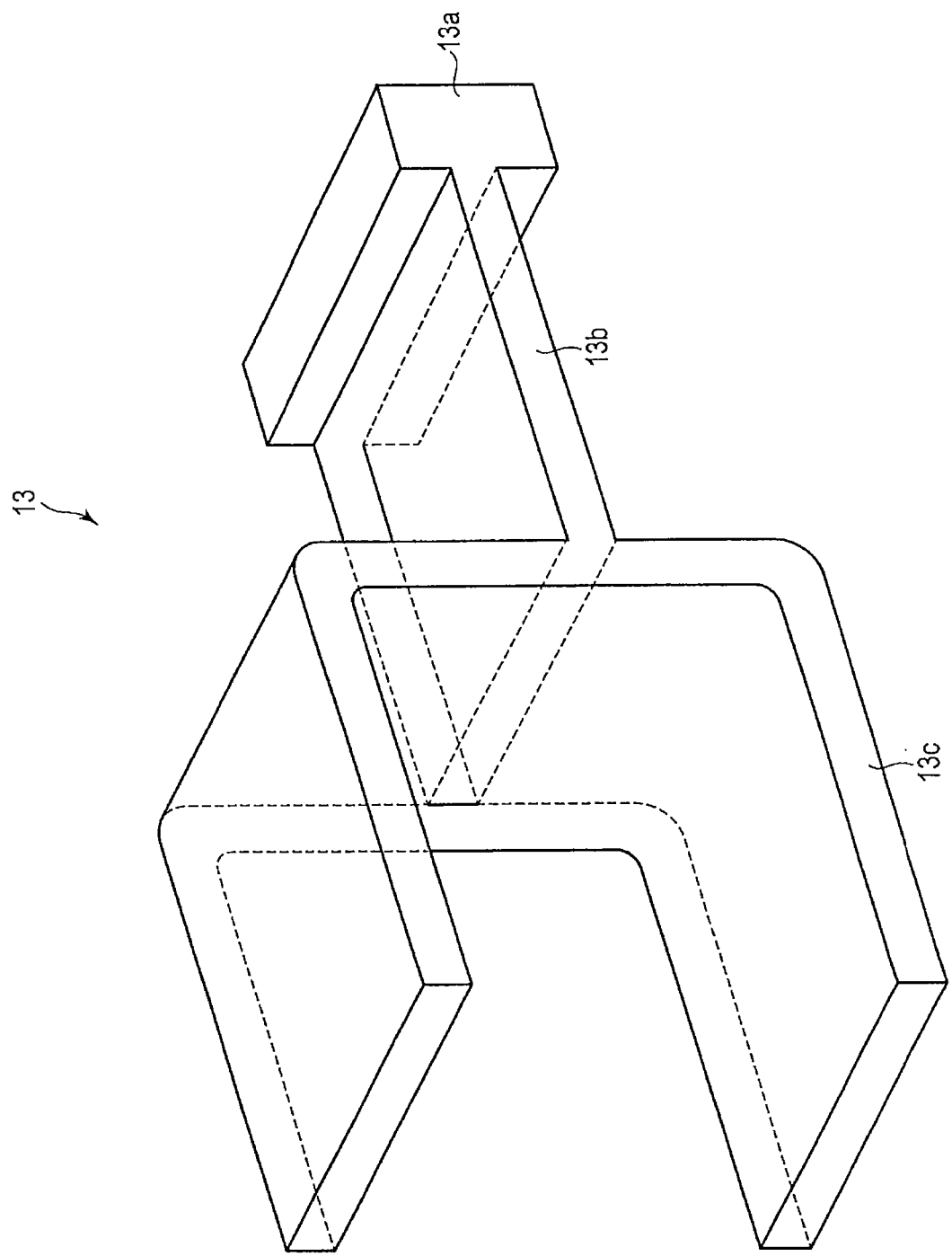
FIG. 13 is a perspective view showing a terminal used in a nonaqueous electrolyte battery of FIG. 12.

As shown in FIG. 13, a negative electrode terminal 13 includes a rectangular head part 13a, a rectangular columnar shaft part 13b extended from the head part 13a, and a holding part 13c that is branched in two from the shaft part 13b and has a nearly U-shaped cross section. Further, a positive electrode terminal 14 has, as shown in FIG. 12, a rectangular head part 14a, a rectangular columnar shaft part 14b extended from the head part 14a, and a holding part 14c that is branched in two from the shaft part 14b and has a U-shaped cross section. The positive electrode terminal 14 and the negative electrode terminal 13 can be formed of a conductive material. Examples of the conductive material include aluminum, aluminum alloys, and copper.

A plurality of sheets of negative electrode tabs 7 of one electrode group 2 are laminated into one and welded to the holding part 13c of the negative electrode terminal 13. Also, a plurality of negative electrode tabs 7 protruded from an end surface of the other electrode group 2 are laminated into one and welded to the holding part 13c of the negative electrode terminal 13. Thereby, the negative electrode tabs 7 of the plurality of electrode groups 2 are electrically connected en-block to the negative electrode terminal 13.

Further, a plurality of sheets of positive electrode tabs 6 of one electrode group 2 are laminated into one and welded to the holding part 14c of the positive electrode terminal 14. Also, a plurality of positive electrode tabs 6 protruded from an end surface of the other electrode group 2 are laminated into one and welded to the holding part 14c of the positive electrode terminal 14. Thereby, the positive electrode tabs 6 of the plurality of electrode groups 2 are electrically connected en-block to the positive electrode terminal 14.

When any one of the second negative electrode parts 4B is changed to the first negative electrode part 4A, a part of the first negative electrode part 4A can be disposed more outside than a part of the negative electrode part 4B.

Further, in FIG. 12, the electrode group of batteries of the first embodiment is used. However, without being restricted thereto, electrode groups of batteries selected from the group consisting of the second to fifth embodiments can be used.

According to the sixth embodiment, a plurality of electrode groups selected from the group consisting of the first to fifth embodiments are provided; accordingly, the energy density of a battery can be more improved.

Seventh Embodiment

A battery pack according to the seventh embodiment will be detailed.

A battery pack has one or more of non-aqueous electrolyte batteries (namely, unit cell) according to the first to sixth embodiments. When a plurality of unit cells are contained in the battery pack, each of the unit cells is provided by electrical connection in series, in parallel, or in a combination of series and parallel.

A battery pack 200 will be specifically described with reference to FIGS. 14 and 15. The battery pack 200 shown in FIG. 14 uses a flat non-aqueous electrolyte battery as a unit cell 21.

A plurality of unit cells 21 are laminated so that a negative electrode terminal 6 and a positive electrode terminal 7, which are extended outside, are arranged in the same direction and bound with a sticky tape 22 to configure a battery module 23. These unit cells 21 are, as shown in FIG. 15, electrically connected in series with each other.

A printed circuit board 24 is disposed facing a side surface of the unit cell 21, from which the negative electrode terminal 6 and positive electrode terminal 7 are extended. On the printed circuit board 24, as shown in FIG. 15, a thermistor 25, a protective circuit 26 and a terminal 27 for energizing external equipment are mounted. To a surface of the protective circuit substrate 24 that faces the battery module 23, an insulating board (not shown in the drawing) is attached to avoid unnecessary connection with conductors of the battery module 23.

A positive electrode lead 28 is connected to the positive electrode terminal 7 located at the lowermost layer of the battery module 23, and a tip thereof is inserted in a positive electrode side connector 29 of the printed circuit board 24 for electrical connection. A negative electrode lead 30 is connected to the negative electrode terminal 6 located on the uppermost layer of the battery module 23, and a tip thereof is inserted in a negative electrode side connector 31 of the printed circuit board 24 to be electrically connected. These connectors 29, 31 are connected via conductors 32, 33 formed on the printed circuit board 24 to the protective circuit 26.

The thermistor 25 is used to detect a temperature of the unit cell 21, and a detection signal thereof is transmitted to the protective circuit 26. The protective circuit 26 can interrupt, under predetermined conditions, a positive conductor 34a and a negative conductor 34b between the protective circuit 26 and the terminal 27 for energizing external equipment. One of the predetermined conditions is, for example, when a temperature detected by the thermistor 25 becomes a predetermined temperature or more. Other predetermined conditions are when over-charging, over-discharging, or over-current of the unit cell 21 is detected. The over-charging or the like of an individual unit cell 21 or battery module 23 is detected. When the individual unit cell 21 is detected, a battery voltage may be detected, or a positive electrode potential or a negative electrode potential may be detected. In the latter case, among individual unit cells 21, a lithium electrode is inserted as a reference electrode. In the case of FIGS. 14 and 15, a conductor 35 for detecting a voltage is connected to each of the unit cells 21 to transmit the detected signal via the conductor 35 to the protective circuit 26.

On each of three surfaces of the battery module 23 except a side surface from which the positive electrode terminal 7 and negative electrode terminal 6 protrude, a protection sheet 36 of rubber or resin is disposed.

The battery module 23 is housed inside of a housing vessel 37 together with the respective protection sheets 36 and the printed circuit board 24. That is, the protection sheet 36 is disposed on each of both inside surfaces in a long side direction and an inside surface in a short side direction of the housing vessel 37, and, on an inside surface on an opposite side in a short side direction, the printed circuit board 24 is disposed. The battery module 23 is located in a space surrounded by the protection sheets 36 and the printed circuit board 24. A lid 38 is attached to a top surface of the housing vessel 37.

In place of the sticky tape 22 for fixing the battery module 23, a heat shrinkable tape may be used. In this case, a protection sheet is disposed on both side surfaces of the battery module, and, after winding around the heat shrinkable tape, the heat shrinkable tape is thermally shrunk to bind the battery module.

Figure 15:
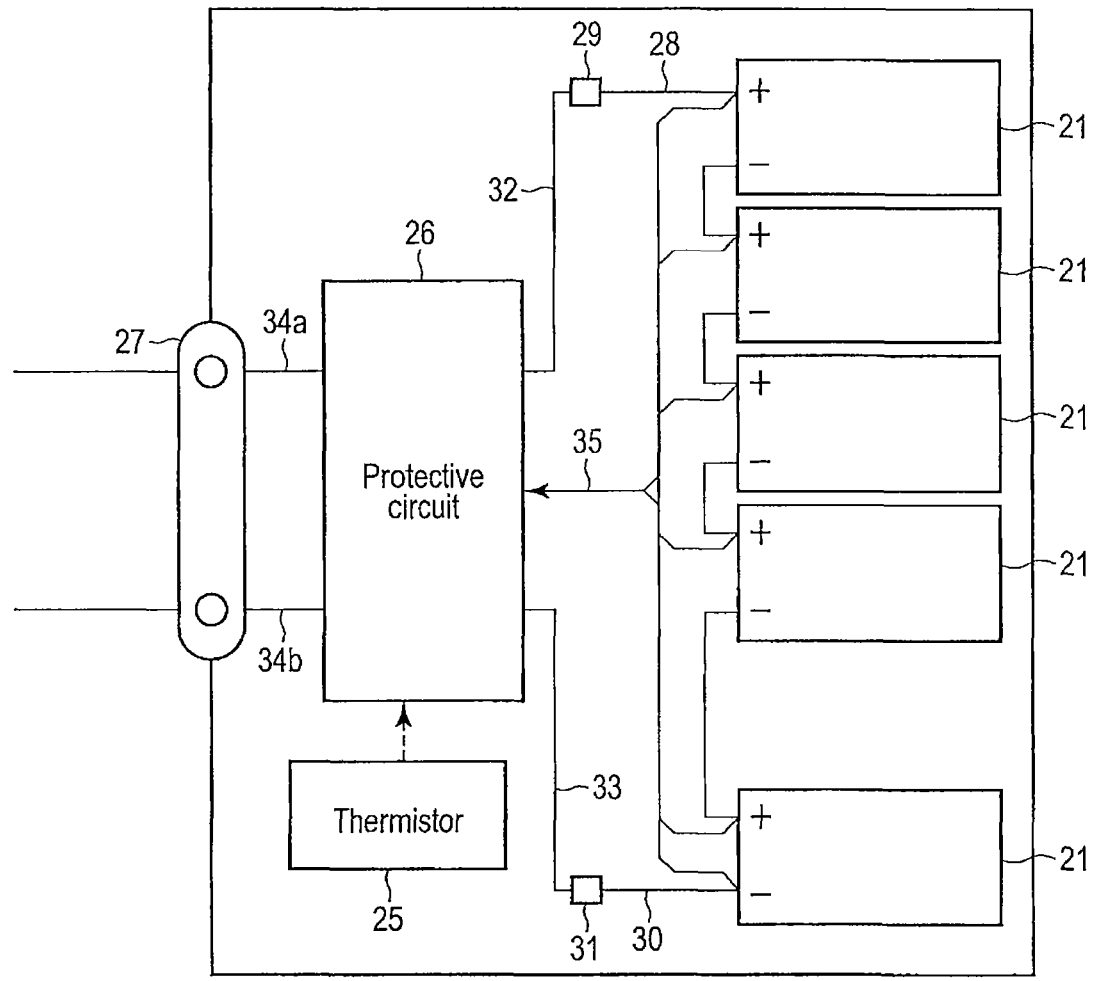
FIG. 15 is a block diagram showing an electric circuit of the battery pack according to the seventh embodiment.

In FIGS. 14 and 15, a mode where unit cells 21 are connected in series is shown. However, in order to increase the battery capacity, the unit cells 21 may be connected in parallel or in a combination of series and parallel. Assembled battery packs may be further connected in series or in parallel.

According to the seventh embodiment, when a non-aqueous electrolyte battery of any one of the first to fifth embodiments, which can avoid a decrease in the battery capacity and an increase in the internal resistance caused by fracture of the metal substrate and has high energy density is provided, a battery pack that can avoid a decrease in the battery capacity and an increase in the internal resistance and has high energy density can be provided.

An embodiment of the battery pack can be changed appropriately depending on the usage. The battery pack is preferably used when excellent cycle characteristics are exhibited when a large current is extracted. Specifically, the battery pack is used for a power source of digital cameras, and for automobiles such as 2 wheel or 4 wheel hybrid electric automobiles, 2 wheel or 4 wheel electric automobiles, and assist bicycles. In particular, a battery pack that uses a non-aqueous electrolyte batteries excellent in the high temperature characteristics is preferably used for automobiles.

EXAMPLES

In what follows, examples will be detailed.

Example 1

Preparation of Positive Electrode

As a positive electrode active material, 90% by mass of lithium nickel composite oxide ($LiNi_{0.8}Co_{0.1}Mn_{0.1}O_2$) powder was used. As a conductive agent, 3% by mass of acetylene black and 3% by mass of graphite were used. As a binder, 4% by mass of polyvinylidene fluoride (PVdF) was used. These components were added to N-methylpyrolidone (NMP) and mixed to prepare a slurry. The slurry was coated on both surfaces of a current collector of a second metal substrate X shown in Table 1 excluding an edge part in parallel with a long side, dried, and pressed to obtain a positive electrode. One edge part where the slurry was not coated and the current collector is exposed works as a positive electrode collector tab.

<Preparation of Negative Electrode>

As a negative electrode active material, lithium titanate ($Li_4Ti_5O_{12}$) powder that has a lithium absorption potential of 1.56 V (vs. $Li/Li^+$) and a spinel structure was prepared. The negative electrode active material was used in an amount of 90% by mass, graphite as a conductive agent was used in an amount of 7% by mass, and polyvinylidene fluoride (PVdF) as a binder was used in an amount of 3% by mass. These components and N-methylpyrrolidone (NMP) were mixed to prepare a slurry.

The resulting slurry was coated on both surfaces of a current collector of a first metal substrate shown in Table 1 excluding an edge part in parallel with a long side, and, after drying, was roll-pressed, thereby a first negative electrode part was obtained. Further, the slurry was coated on both surfaces of a current collector of a second metal substrate shown in Table 1 excluding an edge part in parallel with a long side, and, after drying, was roll-pressed, thereby a second negative electrode part was obtained. In the first and second negative electrode parts, an edge part where the slurry was not coated and the current collector is exposed works as a negative electrode collector tab.

The resulting positive electrode and the second negative electrode part were spiral-wound with a separator of polyethylene having a thickness of 20 μm interposed therebetween. Around the resulting wound matter, the positive electrode and the first negative electrode part were spiral-wound with the separator interposed therebetween. Upon winding, the positive electrode and the negative electrode were displaced so that the positive electrode precedes the negative electrode, the positive electrode collector tab protrudes in a direction of a winding axis of an electrode group, and the negative electrode collector tab protrudes in a direction opposite thereto. The number of windings of the first negative electrode part and the second negative electrode part was set to 50 turns in total. Thereafter, by press-molding, a flat electrode group shown in FIG. 9 was obtained. In the resulting electrode group, the separator was located on the outermost layer, and the first negative electrode part was in contact with the separator of the outermost layer. In the negative electrode, the outermost periphery was the first negative electrode part, and parts other than the outermost periphery were the second negative electrode part.

After a positive electrode lead was welded to a positive electrode collector tab, and a negative electrode lead was welded to a negative electrode collector tab, the electrode group was housed in a metallic case. In a mixed solvent of propylene carbonate (PC) and diethyl carbonate (DEC) (volume ratio 1:2), 1 mol/L of $LiPF_6$ as an electrolyte was dissolved. After the resulting non-aqueous electrolytic solution was injected, the case was sealed, thereby a rectangular non-aqueous electrolyte battery was produced.

Example 2

Preparation of Positive Electrode

The slurry the same as that described in example 1 was coated on both surfaces of a current collector of a first metal substrate X shown in Table 1 excluding an edge part in parallel with a long side, dried, and pressed to obtain a first positive electrode part. One edge part where the slurry was not coated and the current collector is exposed works as a positive electrode collector tab.

Further, as a second positive electrode part, the positive electrode the same as that described in example 1 was prepared.

The resulting first positive electrode part and second negative electrode part were spiral-wound with the same separator as that described in example 1 interposed therebetween. Around the resulting wound matter, the second positive electrode part and the first negative electrode part were spiral-wound with the separator interposed therebetween. Upon winding, the positive electrode and the negative electrode were displaced so that the positive electrode precedes the negative electrode, the positive electrode collector tab protrudes in a direction of winding axis of the electrode group, and the negative electrode collector tab protrudes in a direction opposite thereto. The number of windings of the first negative electrode part and the second negative electrode part was set to 50 turns in total. Thereafter, by press-molding, a flat electrode group shown in FIG. 9 was obtained. In the resulting electrode group, the separator was located on the outermost layer, and the first negative electrode part was in contact with the separator of the outermost layer. In the negative electrode, the outermost periphery was the first negative electrode part, and parts other than the outermost periphery were the second negative electrode part. In the positive electrode, a first positive electrode part included from a winding start edge part to the fifth periphery, and parts other than that were the second positive electrode part.

From the resulting electrode group, in a manner similar to example 1, a rectangular non-aqueous electrolyte battery was produced.

Example 3

A second positive electrode part and a second negative electrode part were spiral-wound with the same separator as that of example 1 interposed therebetween. Around a wound product, a first positive electrode part and the second negative electrode part were spiral-wound with the separator interposed therebetween. Upon winding, the positive electrode and the negative electrode were displaced so that the negative electrode precedes the positive electrode, the positive electrode collector tab protrudes in a direction of winding axis of the electrode group, and the negative electrode collector tab protrudes in a direction opposite thereto. The number of windings of the first positive electrode part and the second positive electrode part was set to 50 turns in total. Thereafter, by press-molding, a flat electrode group shown in FIG. 9 was obtained. In the resulting electrode group, the separator was located on the outermost layer, and the first positive electrode part was in contact with the separator of the outermost layer. In the positive electrode, the outermost periphery was the first positive electrode part, and parts other than the outermost periphery were the second positive electrode part. In the negative electrode, from the winding start edge part to the winding end edge part, the second negative electrode part was used.

From the resulting electrode group, in a manner similar to example 1, a rectangular non-aqueous electrolyte battery was produced.

Example 4

A second positive electrode part and a first negative electrode part were spiral-wound with the same separator as that of example 1 interposed therebetween. Around a wound product, a first positive electrode part and a second negative electrode part were spiral-wound with the separator interposed therebetween. Upon winding, the positive electrode and the negative electrode were displaced so that the negative electrode precedes the positive electrode, a positive electrode collector tab protrudes in a direction of winding axis of the electrode group, and a negative electrode collector tab protrudes in a direction opposite thereto. The number of windings of the first positive electrode part and the second positive electrode part was set to 50 turns in total. Thereafter, by press-molding, a flat electrode group shown in FIG. 9 was obtained. In the resulting electrode group, the separator was located on the outermost layer, and the first positive electrode part was in contact with the separator of the outermost layer. In the positive electrode, the outermost periphery was the first positive electrode part, and parts other than the outermost periphery were the second positive electrode part. In the negative electrode, the first negative electrode part was used from the winding start edge part to the fifth periphery, and in parts other than that, the second negative electrode part was used.

From the resulting electrode group, in a manner similar to example 1, a rectangular non-aqueous electrolyte battery was produced.

Comparative Example 1

A second positive electrode part and a second negative electrode part were spiral-wound with the same separator as that of example 1 interposed therebetween. Upon winding, the positive electrode and the negative electrode were displaced so that the positive electrode precedes the negative electrode, a positive electrode collector tab protrudes in a direction of winding axis of the electrode group, and a negative electrode collector tab protrudes in a direction opposite thereto. Thereafter, by press-molding, a flat electrode group shown in FIG. 9 was obtained. In the resulting electrode group, the separator was located on the outermost layer, and the second negative electrode part was in contact with the separator of the outermost layer.

From the resulting electrode group, in a manner similar to example 1, a rectangular non-aqueous electrolyte battery was produced.

Comparative Example 2

A second positive electrode part and a second negative electrode part were spiral-wound with the same separator as that of example 1 interposed therebetween. Upon winding, the positive electrode and the negative electrode were displaced so that the negative electrode precedes the positive electrode, a positive electrode collector tab protrudes in a direction of winding axis of the electrode group, and a negative electrode collector tab protrudes in a direction opposite thereto. Thereafter, by press-molding, a flat electrode group shown in FIG. 9 was obtained. In the resulting electrode group, the separator was located on the outermost layer, and the second positive electrode part was in contact with the separator of the outermost layer.

From the resulting electrode group, in a manner similar to example 1, a rectangular non-aqueous electrolyte battery was produced.

The number of fractured current collectors when 10 batteries were prepared for each of the examples and comparative examples is shown in the following Table 2.

TABLE 1

|  |  | Tensile strength (N/mm) | Thickness (μm) | Material |
|---|---|---|---|---|
| Positive electrode current collector 1 | First metal substrate X | 2.7 | 10 | JIS 3003 Al alloy foil |
| Positive electrode current collector 2 | First metal substrate Y | 13 | 50 | JIS 3003 Al alloy foil |
| Positive electrode current collector 3 | Second metal substrate X | 1.8 | 10 | JIS 1N30 Al foil |
| Positive electrode current collector 4 | Second metal substrate Y | 9.2 | 50 | JIS 1N30 Al foil |
| Negative electrode current collector 1 | First metal substrate | 3.2 | 10 | Electrolytic copper foil |
| Negative electrode current collector 2 | Second metal substrate | 1.8 | 10 | JIS 1N30 Al foil |

TABLE 2

| | | (Wound electrode group) | | | | |
|---|---|---|---|---|---|---|
| | Winding method | Fifth layer from center of winding (positive electrode current collector) | Outermost periphery (positive electrode current collector) | Fifth layer from center of winding (negative electrode current collector) | Outermost periphery (negative electrode current collector) | Number of fractured current collectors |
| Example 1 | Precedent winding of positive electrode, negative electrode inside of separator of outermost layer | Second metal substrate X | Second metal substrate X | Second metal substrate | First metal substrate | 4 |
| Example 2 | Precedent winding of positive electrode, negative electrode inside of separator of outermost layer | First metal substrate X | Second metal substrate X | Second metal substrate | First metal substrate | 1 |
| Example 3 | Precedent winding of negative electrode, positive electrode inside of separator of outermost layer | Second metal substrate X | First metal substrate X | Second metal substrate | Second metal substrate | 5 |
| Example 4 | Precedent winding of negative electrode, positive electrode inside of separator of outermost layer | Second metal substrate X | First metal substrate X | First metal substrate | Second metal substrate | 1 |
| Comparative Example 1 | Precedent winding of positive electrode, negative electrode inside of separator of outermost layer | Second metal substrate X | Second metal substrate X | Second metal substrate | Second metal substrate | 6 |
| Comparative Example 2 | Precedent winding of negative electrode, positive electrode inside of separator of outermost layer | Second metal substrate X | Second metal substrate X | Second metal substrate | Second metal substrate | 7 |

As is obvious from Table 2, compared with electrode groups prepared according to comparative examples 1 and 2, electrode groups prepared according to examples 1 to 4 have less current collector fractures. That is, it was confirmed that, in the wound electrode groups, when the second electrode part is unevenly distributed in the vicinity of the outermost layer where stress tends to be applied, fractures of the current collectors can be reduced.

Example 5

Preparation of Positive Electrode

The same slurry as that described in example 1 was coated on both surfaces of a current collector of a first metal substrate X shown in Table 1 except one edge part, dried, pressed and cut to obtain a first positive electrode part having a structure shown in FIG. 2.

Further, the slurry was coated on both surfaces of a current collector of a second metal substrate X shown in Table 1 except one edge part, dried, pressed and cut to obtain a second positive electrode part having a structure shown in FIG. 2.

<Preparation of Negative Electrode>

The same slurry as that described in example 1 was coated on both surfaces of a current collector of a first metal substrate shown in Table 1 except one edge part, dried, pressed and cut to obtain a first negative electrode part.

Further, the slurry was coated on both surfaces of a current collector of a second metal substrate shown in Table 1 except one edge part, dried, pressed and cut to obtain a second negative electrode part.

A second positive electrode part and a second negative electrode part were alternately laminated with the same separator as that of example 1 interposed therebetween to obtain a laminate where the outermost layer was the second negative electrode part. After the first positive electrode part is laminated via the separator on the resulting laminate, the separator was superposed on the first positive electrode part to produce a laminated electrode group having a structure shown in FIG. 6. The number of laminated layers was set to 100.

A plurality of sheets of positive electrode collector tab were welded to a positive electrode lead, and, a plurality of sheets of negative electrode collector tab were welded to a negative electrode lead. Thereafter, an electrode group was housed in a metallic case. After the same nonaqueous electrolytic solution as that described in example 1 was injected, the case was sealed to prepare a rectangular non-aqueous electrolyte battery having a structure shown in FIG. 6.

Example 6

A second positive electrode part and a second negative electrode part were alternately laminated with the same separator as that of example 1 interposed therebetween to obtain a laminate where the outermost layer was the second positive electrode part. After a first negative electrode part was laminated via the separator on the resulting laminate, the separator was superposed on the first negative electrode part to produce a laminated electrode group having a structure shown in FIG. 1. The number of laminated layers was set to 100.

From the resulting laminated electrode group, in a manner similar to example 5, a rectangular non-aqueous electrolyte battery having a structure shown in FIG. 1 was produced.

Example 7

Except that in a current collector of a first positive electrode part, a first metal substrate Y shown in Table 1 was used, and in a current collector of a second positive electrode part, a second metal substrate Y shown in Table 1 was used, in a manner similar to example 5, a rectangular non-aqueous electrolyte battery having a structure shown in FIG. 1 was produced.

Comparative Example 3

A second positive electrode part and a second negative electrode part were alternately laminated with the same separator as that of example 1 interposed therebetween to obtain a laminate where the outermost layer was the second negative electrode part. After the second positive electrode part was laminated via the separator on the resulting laminate, the separator was superposed on the second positive electrode part to produce a laminated electrode group.

From the resulting laminated electrode group, in a manner similar to example 5, a rectangular non-aqueous electrolyte battery was produced.

Comparative Example 4

A second positive electrode part and a second negative electrode part were alternately laminated with the same separator as that of example 1 interposed therebetween to obtain a laminate where the outermost layer was the second positive electrode part. After the second negative electrode part was laminated via the separator on the resulting laminate, the separator was superposed on the second negative electrode part to produce a laminated electrode group.

From the resulting laminated electrode group, in a manner similar to example 5, a rectangular non-aqueous electrolyte battery was produced.

The number of fractured current collectors when 10 batteries were prepared for each of examples and comparative examples is shown in the following Table 3.

TABLE 3

| | (Laminated electrode group) | | | |
| --- | --- | --- | --- | --- |
| | Method of lamination | Electrode in contact with separator of the outermost layer | Current collector of electrode of the outermost layer | The number of fractured current collectors |
| Example 5 | The outermost layer was the separator; the positive electrode was inside thereof | Positive electrode | First metal substrate X | 1 |
| Example 6 | The outermost layer was the separator; the negative electrode was inside thereof | Negative electrode | First metal substrate | 0 |
| Example 7 | The outermost layer was the separator; the positive electrode was inside thereof | Positive electrode | First metal substrate Y | 0 |

TABLE 3-continued (Laminated electrode group)

| | Method of lamination | Electrode in contact with separator of the outermost layer | Current collector of electrode of the outermost layer | The number of fractured current collectors |
|---|---|---|---|---|
| Comparative Example 3 | The outermost layer was the separator; the positive electrode was inside thereof | Positive electrode | Second metal substrate X | 4 |
| Comparative Example 4 | The outermost layer was the separator; the negative electrode was inside thereof | Negative electrode | Second metal substrate | 4 |

As is obvious from Table 3, compared with electrode groups prepared according to comparative examples 3 and 4, electrode groups prepared according to examples 5 to 7 have less fractured current collectors. That is, it was confirmed that when the second electrode part is unevenly distributed in the uppermost layer and lowermost layer of the laminated electrode group, the number of fractured current collectors can be reduced.

According to a non-aqueous electrolyte battery of at least one of the embodiments described above, a part of a first electrode part is provided more outside of the electrode group than a part of a second electrode part, and a first metal substrate is larger in the tensile strength than a second metal substrate; accordingly, irrespective of a thickness of a current collector, and the current collector can be inhibited from fracturing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-aqueous electrolyte battery comprising:
a case; and
an electrode group which is provided in the case and comprises a positive electrode and a negative electrode,
wherein at least one of the positive electrode and the negative electrode has a first electrode part which comprises a first metal substrate and an active material-containing part formed at least partially on the first metal substrate and a second electrode part which comprises a second metal substrate and an active material-containing part formed at least partially on the second metal substrate;
the first metal substrate has a tensile strength larger than a tensile strength of the second metal substrate; and
a part of the first electrode part is provided more outside of the electrode group than a part of the second electrode part.

2. The battery of claim 1, wherein the negative electrode has the first electrode part and the second electrode part, and the active material-containing part of both of the first electrode part and the second electrode part of the negative electrode comprises a negative electrode active material having a lithium absorption potential of 0.4 V or more (vs. Li/Li$^+$).

3. The battery of claim 2, wherein the negative electrode active material comprises at least one of lithium-titanium oxide and lithium-titanium composite oxide.

4. The battery of claim 2, wherein the first metal substrate of the first electrode part of the negative electrode comprises copper or an aluminum alloy, and the second metal substrate of the second electrode part of the negative electrode comprises aluminum.

5. The battery of claim 1, wherein
the first metal has a first collector tab at a place where the active material-containing part is not formed;
the second metal substrate has a second collector tab at a place where the active material-containing part is not formed; and
the first collector tab is connected with the second connector tab to electrically connect the first electrode part and the second electrode part.

6. The battery of claim 1, wherein at least one or more of the electrode groups is provided in the case.

7. The battery of claim 1, wherein the tensile strengths of the first metal substrate and the second metal substrate satisfy the relationship of the following equation (1):

$$X_2 \times 1.5 \leq X_1 \quad (1)$$

wherein $X_1$ represents the tensile strength (N/mm) of the first metal substrate, and $X_2$ represents the tensile strength (N/mm) of the second metal substrate.

8. The battery of claim 1, wherein the electrode group further comprises a separator, and has a structure where the positive electrode and the negative electrode are wound with the separator interposed therebetween, an outermost layer of the electrode group being the separator, and a part of the first electrode part being in contact with the outermost layer.

9. The battery of claim 1, wherein the electrode group further comprises a separator, and has a structure where the positive electrode and the negative electrode are wound with the separator interposed therebetween, a part of the first electrode part being an outermost layer of the electrode group.

10. The battery of claim 1, wherein the electrode group further comprises a separator, and has a structure where the positive electrode and the negative electrode are laminated with the separator interposed therebetween, an outermost layer of the electrode group being the separator, and a part of the first electrode part being in contact with the outermost layer.

11. The battery of claim 1, wherein the electrode group further comprises a separator, and has a structure where the positive electrode and the negative electrode are laminated with the separator interposed therebetween, a part of the first electrode part being an outermost layer of the electrode group.

12. The battery of claim 1, wherein the electrode group comprises:
a plurality of first collector tabs provided at a place where the active material-containing part in the first metal substrate configuring the part of the first electrode part is not formed;

a plurality of second collector tabs provided at a place where the active material-containing part in the second metal substrate configuring the part of the second electrode part is not formed; and a terminal by which the first collector tabs and the second collector tabs are electrically connected.

13. A battery pack comprising:
one or more of the non-aqueous electrolyte batteries of claim 1.

14. The battery of claim 1, wherein each of the first metal substrate and the second metal substrate is a current collector.

15. The battery of claim 1, wherein the positive electrode has a first electrode part which comprises a first metal substrate and an active material-containing part formed at least partially on the first metal substrate and a second electrode part which comprises a second metal substrate and an active material-containing part formed at least partially on the second metal substrate.

16. The battery of claim 1, wherein the negative electrode has a first electrode part which comprises a first metal substrate and an active material-containing part formed at least partially on the first metal substrate and a second electrode part which comprises a second metal substrate and an active material-containing part formed at least partially on the second metal substrate.

17. The battery of claim 1, wherein the positive electrode and the negative electrode each have a first electrode part which comprises a first metal substrate and an active material-containing part formed at least partially on the first metal substrate, and a second electrode part which comprises a second metal substrate and an active material-containing part formed at least partially on the second metal substrate.

* * * * *